United States Patent
Tabata et al.

(10) Patent No.: US 7,722,497 B2
(45) Date of Patent: May 25, 2010

(54) CONTROL DEVICE FOR VEHICLE DRIVE APPARATUS

(75) Inventors: Atsushi Tabata, Okazaki (JP); Yutaka Taga, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 384 days.

(21) Appl. No.: 11/759,722

(22) Filed: Jun. 7, 2007

(65) Prior Publication Data

US 2008/0009388 A1    Jan. 10, 2008

Related U.S. Application Data

(60) Provisional application No. 60/812,984, filed on Jun. 13, 2006.

(51) Int. Cl.
*B60W 10/02* (2006.01)
*B60W 10/18* (2006.01)
(52) U.S. Cl. .................... 477/3; 477/4; 477/5; 477/6
(58) Field of Classification Search ............... 477/2, 477/3, 4, 5, 6
See application file for complete search history.

(56) References Cited

U.S. PATENT DOCUMENTS 6,371,878 B1 *    4/2002    Bowen ................... 475/5
7,053,566 B2 *    5/2006    Aizawa et al. ............. 318/34
7,566,288 B2 *    7/2009    Tabata et al. .............. 477/4
2005/0245350 A1*  11/2005   Tabata et al. .............. 477/34

FOREIGN PATENT DOCUMENTS

| JP | 11-217025 | 8/1999 |
|----|-----------|--------|
| JP | 2000-2327 | 1/2000 |
| JP | 2003-193878 | 7/2003 |
| JP | 2003-269596 | 9/2003 |
| JP | 2004-278340 | 10/2004 |

* cited by examiner

*Primary Examiner*—Ha D. Ho
(74) *Attorney, Agent, or Firm*—Oblon, Spivak, McClelland, Maier & Neustadt, L.L.P.

(57) ABSTRACT

An engaging device (a switching clutch C0 or a switching brake B0) switches a shifting mechanism 10 between a continuously variable shifting state and a step-variable shifting state. In particular. The step-variable shifting state is set in a high speed running, because a first electric motor M1 need not bear a reaction torque against an input torque $T_{INS}$ inputted into a differential portion 11, the first electric motor M1 is prevented from being large-sized and suppressed in durability lowering. Even when switching to the step-variable shifting state is unable, the input torque $T_{INS}$ against which the first electric motor M1 should bear the reaction torque, is limited by an input torque control means 86, and the first electric motor M1 is prevented from being large-sized and suppressed in durability lowering.

24 Claims, 11 Drawing Sheets

|  | C0 | C1 | C2 | B0 | B1 | B2 | B3 | SPEED RATIO | STEPPING RATIO |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL 4.76 |
| R |  |  | ○ |  |  |  | ○ | 3.209 |  |
| N |  | ○ |  |  |  |  |  |  |  |

○ ENGAGED
◎ ENGAGED IN STEP-VARIABLE, RELEASED IN CONTINUOUSLY-VARIABLE

|  | C0 | C1 | C2 | B0 | B1 | B2 | SPEED RATIO | STEPPING RATIO |
|---|---|---|---|---|---|---|---|---|
| 1st | ◎ | ○ |  |  |  | ○ | 2.804 | 1.54 |
| 2nd | ◎ | ○ |  |  | ○ |  | 1.531 | 1.53 |
| 3rd | ◎ | ○ | ○ |  |  |  | 1.000 | 1.42 |
| 4th |  | ○ | ○ | ◎ |  |  | 0.705 | TOTAL 3.977 |
| R |  |  | ○ |  |  | ○ | 2.393 |  |
| N |  | ○ |  |  |  |  |  |  |

○ ENGAGED
◎ ENGAGED IN STEP-VARIABLE, RELEASED IN CONTINUOUSLY-VARIABLE

CONTROL DEVICE FOR VEHICLE DRIVE APPARATUS

TECHNICAL FIELD

The present invention relates to a control device for a vehicle drive apparatus. Here, the vehicle drive apparatus includes a differential mechanism performing a differential action to distribute an engine output to a first electric motor and an output shaft, and a second electric motor disposed in a power transmitting path between the distributing mechanism and drive wheels. Especially, the present invention relates to technology to prevent a large-sizing of the first electric motor which bears a reaction force against an engine torque.

BACKGROUND ART

There has heretofore been known a drive apparatus of a vehicle including a differential device through which an output of a drive power source, such as an engine or the like, is distributed to a first electric motor and an output member, and a second electric motor disposed between the output member and drive wheels. Such drive apparatus for a hybrid vehicle is disclosed for example in the Patent Literature 1 (JP 2000-2327A). It includes a differential mechanism being comprised of a planetary gear unit and performing a differential action for mechanically transmitting a major part of power outputted from the engine to drive wheels. A remaining part of power from the engine is electrically transmitted from the first electric motor to the second electric motor using an electrical path. Thus, the drive apparatus operates a transmission of which shifting ratio is electrically changed, for example as an electrically controlled continuously variable automatic transmission. The drive apparatus is controlled by the control device so that the vehicle runs with the optimum operation state of the engine, thus improving fuel consumption, i.e., mileage.

However, for a hybrid vehicle drive apparatus such as that disclosed in Patent Literature 1 to be controlled as a transmission which electrically changes the shifting ratio, the first electric motor bears a reaction torque against an input torque, such as an output torque of the engine (referred to hereinafter as "engine torque"), that is inputted into the drive apparatus. The first electric motor is required to have a reaction torque capacity that corresponds to the engine torque. In order to increase the reaction torque born by the first electric motor in accordance with an increase of the engine torque, etc. demanded for example to obtain a desired running performance, the first electric motor had to be made larger in size as the engine was made higher in the output.

In other words, if a large-sizing of the first electric motor is difficult from the standpoint of installation in the vehicle, the first electric motor may not bear the reaction torque against the engine torque and the durability thereof may be lowered or degraded. The large-sizing prevention and durability maintenance of the first electric motor are incompatible with each other, and cannot readily be realized at the same time.

SUMMARY OF THE INVENTION

The present invention has been made with the above circumstances as the background, and has an object to provide a control device for a vehicle drive apparatus which includes a differential mechanism which enables a differential action of distributing an output of an engine to a first electric motor and an output shaft; and an electric motor disposed in a power transmitting path from the differential mechanism to drive wheels. The control device for controlling the first electric motor that bears the reaction torque against an input torque inputted into the drive apparatus is prevented from being made large in size, and suppressed in its durability lowering.

In an aspect of the invention, the vehicle drive apparatus includes (i) a continuously variable transmission part having a differential mechanism distributing an output of an engine to a first electric motor and a transmitting member, and a second electric motor disposed in a power transmitting path from the transmitting member to drive wheels, and operating as an electrically controlled continuously variable transmission; and (ii) an automatic transmission part constituting a portion of the power transmitting path and functioning as an automatic transmission.

The control device comprises (iii) a differential state switching device that is disposed in the differential mechanism and that selectively switches the continuously variable transmission part between a continuously variable shifting state for performing an electrically controlled continuously variable shifting operation, and a shifting state not for performing the electrically controlled continuously variable shifting operation; and (iv) an input torque limit means that limits, upon switching of the continuously variable transmission part from the continuously variable shifting state to the shifting state not performing the electrically controlled continuously variable shifting operation being unable, an input torque inputted into the continuously variable transmission part to a value not more than a predetermined torque.

With the present invention, the differential state switching device selectively switches the continuously variable transmission part in the drive apparatus of the vehicle between the continuously variable shifting state in which the electrically controlled continuously variable shifting operation is performed, and a shifting state in which the electrically controlled continuously variable shifting operation is not performed. The drive apparatus is realized, which has advantages of both a fuel consumption improvement effect of the transmission electrically changing the shifting ratio, and a high transmission efficiency of a gear type transmitting device mechanically transmitting the power. For example, in a normal output area of the engine for a low to medium speed running and a low to medium output running of the vehicle, the continuously variable transmission is placed in the continuously variable shifting state, to secure fuel consumption performance of the vehicle.

However, in the high speed running, the drive apparatus is placed in the shifting state in which the continuously variable transmission part does not perform the electrically controlled continuously variable shifting operation, so that the engine output is transmitted to the drive wheels mainly via a mechanical power transmitting path. A conversion loss between motor power and electrical energy occurring during operation as the transmission that electrically changes the shifting ratio is suppressed. Fuel consumption of the vehicle is thereby improved.

Also, in a high output running, the continuously variable transmission part is placed in the shifting state which does not perform the electrically controlled continuously variable shifting operation. The area for performing an operation as a transmission that electrically changes the shifting ratio, corresponds to the area of low to medium speed running and low to medium output running of a vehicle. The maximum value of the electrical energy to be generated by the electric motor, in other words, the electrical energy to be transmitted by the electric motor can be made small, whereby the electric motor and in turn the vehicle drive apparatus includes it can be made even more compact. That is, in the high output running, because the continuously variable transmission part is placed in the shifting state which does not perform the electrically controlled continuously variable shifting operation, and the first electric motor need not bear the reaction torque against the input torque inputted into the drive apparatus. Thus, the first electric motor can be prevented from being large-sized, and suppressed in its durability lowering.

Also, according to the present invention, the drive apparatus includes the continuously variable transmission part that is made switchable between the continuously variable shifting state and the shifting state not performing the electrically controlled continuously variable shifting operation. When the continuously variable transmission part cannot be switched from the continuously variable shifting state to the abovementioned shifting state, the input torque limit means limits the input torque inputted into the continuously variable transmission to a value or value not more than i.e., below the predetermined torque. The output of the first electric motor that bears the reaction torque against the input torque can thereby be made small, in comparison with a case where the input torque is not limited. That is, even when the continuously variable transmission part cannot be switched from the continuously variable shifting state to the shifting state, the maximum value of the output to be generated by the first electric motor need not be increased to accommodate for cases of the non-limited input torque. The first electric motor is thus prevented from being made large-sized. The input torque inputted into the drive apparatus against which the first electric motor bears the reaction torque is limited, whereby the lowering of the durability of the first electric motor is suppressed.

In another aspect, the shifting state not performing the electrically controlled continuously variable shifting operation, corresponds to a step-variable shifting state. By this arrangement, the differential state switching device selectively switches the continuously variable transmission part in the drive apparatus of the vehicle between the continuously variable shifting state which performs the electrically controlled continuously variable shifting operation, and the step-variable shifting state which does not perform the electrically controlled continuously variable shifting operation.

With this, the drive apparatus is realized, which has advantages of both the improved fuel consumption effect of a transmission which electrically changes the shifting ratio, and a high transmission efficiency of a gear type transmitting device that mechanically transmits power. For example, the first electric motor need not be bear the reaction torque against the input torque inputted into the drive apparatus in the high output running because of the step-variable shifting state of the continuously variable transmission part. Thus, the first electric motor is prevented from being large-sized, and suppressed in its durability lowering.

Also, the drive apparatus includes the continuously variable transmission part that is made switchable between the continuously variable shifting state and the step-variable shifting state. When the continuously variable transmission part cannot be switched from the continuously variable shifting state to the step-variable shifting state, the input torque limit means limits the input torque inputted into the continuously variable transmission to the value not more than a predetermined torque. With this, the output of the first electric motor that bears the reaction torque against the input torque can be made small, in comparison with the case of the non-limited input torque.

That is, even when the continuously variable transmission is unable to be switched from the continuously variable shifting state to the step-variable shifting state, the maximum value of the output to be generated by the first electric motor need not be increased to accommodate for cases where the input torque is not limited, whereby the first electric motor is prevented from being large-sized. Also, the input torque inputted into the drive apparatus against which the first electric motor bears the reaction torque is limited, so that the lowering of the durability of the first electric motor is suppressed.

In another aspect, the input torque inputted into the continuously variable transmission part corresponds to an output torque of the engine, that is the drive power source for vehicle running. By this arrangement, when the continuously variable transmission part of the drive apparatus is unable to be switched from the continuously variable shifting state to the shifting state not performing the electrically controlled continuously variable shifting operation for example the step-variable shifting state, the input torque limit means limits the output torque of the engine to the value not more than the predetermined torque. With this, the output of the first electric motor that bears the reaction torque against the output torque of the engine can be made small, in comparison with cases of the non-limited output torque of the engine.

That is, even upon the continuously variable transmission being unable to be switched from the continuously variable shifting state to the shifting state not performing electrically controlled continuously variable shifting operation, the maximum value of the output to be generated by the first electric motor need not be increased to accommodate for cases of the non-limited output torque of the engine. Thus, the first electric motor is prevented from being large-sized. Because of the limited engine output torque against which the first electric motor bears the reaction torque, the lowering or degrading of the durability of the first electric motor is suppressed.

In an other aspect, the input torque limit means limits the input torque inputted into the continuously variable transmission to the value not more than the predetermined torque, based on the reaction torque generable by the first electric motor against the above-mentioned input. By this arrangement, the first electric motor can bear in its output the reaction torque against the input torque inputted into the continuously variable transmission, and is suppressed in its durability lowering. This in turn secures an input torque of up to the predetermined value, resulting in the suppressed lowering of the demanded power performance.

In another aspect, the vehicle drive apparatus includes a differential portion having a differential mechanism distributing an output of an engine to a first electric motor and a transmitting member, and a second electric motor disposed in a power transmitting path from the transmitting member to drive wheels, and operating as an electrically controlled differential device. The control device comprising (i) a differential state switching device that is disposed in the differential mechanism and that selectively switches the differential mechanism between a differential state for performing an differential action, and a locked state not for performing the differential action; and (ii) an input torque limit means that limits, upon the differential mechanism being unable to be switched from the differential state to the locked state, an input torque inputted into the differential portion to a value not more than a predetermined torque.

According to the present invention, the differential mechanism in the vehicle drive apparatus can switch the differential state switching device between the differential state for operating the differential action, and the locked state for not operating the differential action. The drive apparatus is realized, which has advantages of both the improved fuel consumption effect of the transmission which electrically changes the shifting ratio, and a high transmission efficiency of a gear type transmission device which mechanically transmits power. For example, in a normal output area of an engine for low to medium speed running and low to medium output running of the vehicle, the differential mechanism is placed in the differential state to secure the fuel consumption performance of the vehicle.

On the other hand, in the high speed running, the differential mechanism is placed in the locked state, to transmit the engine output to the drive wheels mainly via a mechanical power transmitting path. Thus, a conversion loss between motor power and electrical energy, occurring during operation as the transmission electrically changing the shifting ratio is suppressed, thereby improving the fuel consumption of the vehicle.

Also, because the differential mechanism is placed in a locked state in the high output running, the area where the transmission electrically changes the shifting ratio, corresponds to the area of low to medium speed running and low to medium output running. The maximum value of the electrical energy to be generated by the electric motor, in other words, the electrical energy to be transmitted by the electric motor can be made small, so that the electric motor and in turn the vehicle drive apparatus including it can be made even more small-sized. That is, in the high output running, the differential mechanism is placed in the locked state which means the first electric motor need not bear the reaction torque against the above-mentioned input torque. Thus, the first electric motor can be prevented from being large-sized, and be suppressed in its durability lowering.

Also, in the drive apparatus including the differential mechanism that is made switchable between the differential state and the locked state, when the differential mechanism is unable to be switched from the differential state to the locked state, the input torque limit means limits the input torque inputted into the differential portion to the value not more than the predetermined torque. With this, the output of the first electric motor that bears the reaction torque against the input torque can be made small, in comparison with the case of the non-limited input torque. That is, even when the differential mechanism is unable to be switched from the differential state to the locked state, the maximum value of the output to be generated by the first electric motor need not be increased to accommodate for the case of the non-limited input torque, so that the large-sizing of the first electric motor is prevented. Also, because of the limited input torque against which the first electric motor bears the reaction torque, the durability lowering of the first electric motor is suppressed.

In another aspect, the input torque inputted into the differential portion corresponds to an output torque of the engine forming the drive power source for vehicle running. By this arrangement, when the differential mechanism is unable to be switched from the differential state to the locked state, the input torque limit means limits the engine output torque to the value not more than the predetermined torque. Consequently, the output of the first electric motor that bears the reaction torque against the engine output torque can be made small, in comparison with the case of the non-limited output torque. That is, even when the differential mechanism is unable to be switched from the differential state to the locked state, the first electric motor is not required to increase in the maximum output value generated to accommodate for cases of the non-limited engine output torque. Thus, the first electric motor is prevented from being made large-sized. Also, because the limited engine output torque against which the first electric motor is to provide the reaction torque, the lowering of the durability of the first electric motor is suppressed.

In another aspect, the input torque limit means limits the input torque inputted into the differential portion to the value not more than the predetermined torque, based on the reaction torque generable by the first electric motor against the input torque inputted into the differential portion. By this arrangement, the output of the first electric motor can bear the reaction torque against the input torque inputted into the differential portion by its output and is suppressed in its durability lowering. Also, because an input torque inputted into the differential portion can be secured up to the predetermined torque, so that the lowering of the demanded power performance is suppressed.

In another aspect, the differential state switching device switches the continuously variable shifting portion to the continuously variable shifting state and the shifting state not performing the continuously variable shifting operation, based on output of the engine. In another aspect, the differential state switching device switches the continuously variable shifting portion to the continuously variable shifting state and the shifting state not performing the continuously variable shifting operation, based on vehicle speed of the vehicle. In another aspect, the differential state switching device switches the continuously variable shifting portion to the continuously variable shifting state and the shifting state not performing the continuously variable shifting operation, based on rotation speed of the engine. In another aspect, the automatic transmission part is disposed in the power transmitting path extending from the continuously variable transmission part to the drive wheels.

In another aspect, the automatic transmission part functions as a step variable transmission having plural gear positions, and the continuously variable transmission part can be switched, in each of the plural gear positions, to the continuously variable shifting state and the shifting state not performing the continuously variable shifting operation. In another aspect, the continuously-variable shifting part has plural rotary elements, and the differential state switching device has brake means for stopping one of the plural rotary elements, and couple means for coupling two of the plural rotary elements. In another aspect, when the continuously-variable shifting portion is switched to the shifting state not performing the continuously-variable shifting operation, the brake means or the couple means of the differential state switching device is selectively operated.

In another aspect, the differential state switching device switches the differential mechanism to the differential state and the lock state, based on output of the engine. In another aspect, the differential state switching device switches the differential mechanism to the differential state and the lock state, based on vehicle speed of the vehicle. In another aspect, the differential state switching device switches the differential mechanism to the differential state and the lock state, based on rotation speed of the engine.

In another aspect, the differential portion has plural rotary elements, and the differential state switching device has brake means for stopping one of the plural rotary elements, and couple means for coupling two of the plural rotary elements. In another aspect, when the differential mechanism is switched to the shifting state not performing the differential operation, the brake means or the couple means of the differential state switching device is selectively operated.

Preferably, in another aspect, the continuously variable transmission is placed in the continuously variable shifting state by the differential mechanism being put in the differential state performing the differential action by the differential state switching device. It is placed in the shifting state not performing the electrically controlled continuously variable shifting operation such as the step-variable shifting state, by the differential mechanism being placed in the locked state not performing the differential action. The continuously variable transmission can thereby be switched between the continuously variable shifting state and the step-variable shifting state.

Also preferably, in another aspect, the differential portion is placed in the differential state by the differential mechanism being placed in the differential state, by the differential state switching device for performing the differential action. It is placed in the locked state by the differential mechanism being placed in the locked state for not performing the differential action. The differential portion is thereby switched between the differential state and the locked state.

Also preferably, the differential mechanism includes a first element connected to the engine, a second element connected to the first electric motor, and a third element connected to the transmitting member. The differential state switching device puts the first to third elements rotatable relative to each other to place the differential mechanism in the differential state, and puts all three elements in an integrally rotating state or puts the second element in a non-rotating state to place the differential mechanism in the locked state. The differential mechanism is thereby switched between the differential state and the locked state.

Also preferably, the differential state switching device includes a clutch that connects at least two of the first to third elements to each other to make the three elements rotate integrally and/or a brake that connects the second element to a non-rotating member to put the second element in the non-rotating state. The differential mechanism is thereby switched between the differential state and the locked state in a simple manner.

Also preferably, the differential mechanism is put, by release of both the clutch and the brake, into the differential state to allow the relative rotation of the first rotating element to the third rotating element for functioning as an electrically controlled differential device. The differential mechanism is made to function as a transmission with a shifting ratio of 1 by the engagement i.e., coupling of the clutch, or is made to function as a speed-increasing transmission with a shifting ratio less than 1 by the engagement of the brake. By this arrangement, the differential mechanism is switched between the differential state and the locked state and can be made to function as a transmission with a single fixed shifting ratio or multiple fixed shifting ratios.

Also preferably, the differential mechanism is comprised of a planetary gear unit, of which the first element is a carrier, the second element is a sun gear, and the third element is a ring gear. By this arrangement, the differential mechanism can be made small in its axial direction and can be configured simply by a single planetary gear unit.

Also preferably, by composing the planetary gear unit with a single pinion type planetary gear unit, the differential mechanism can be made small in its axial direction and can be configured simply by a single planetary gear unit.

Also preferably, in another aspect, the overall shifting ratio of the vehicle drive apparatus is determined based on the shifting ratio of the automatic transmission and the shifting ratio of the continuously variable transmission. By this arrangement, a wide drive force range can be obtained by use of the automatic transmission shifting ratio, so that the efficiency of the electric control of the continuously variable shifting operation of the continuously variable transmission is further improved.

Also preferably, in another aspect, the drive apparatus includes an automatic transmission that constitutes a portion of the power transmitting path. The overall shifting ratio of the vehicle drive apparatus is determined based on the shifting ratio of the automatic transmission and the shifting ratio of the differential portion. By this arrangement, a wide drive force range can be obtained by use of the automatic transmission shifting ratio, so that the efficiency of control of the differential portion as an electrical differential device is further improved.

Also preferably, the automatic transmission is configured as a step-variable automatic transmission. In this case, in the continuously variable shifting state of the continuously variable transmission, or in the differential state of the differential portion, the continuously variable transmission is constituted by the continuously variable transmission part or the differential portion and the step-variable type automatic transmission. Meanwhile, in the shifting state not performing the electrically controlled continuously variable shifting operation by the continuously variable transmission, for example, in the step-variable shifting state or in the locked state of the differential portion, the step-variable transmission is constituted by the continuously variable transmission part or the differential portion and the step-variable type automatic transmission.

BEST MODE FOR CARRYING OUT THE INVENTION

Hereinafter, embodiments of the present invention will be explained with reference to attaching drawings.

First Embodiment

Figures 1, 2:
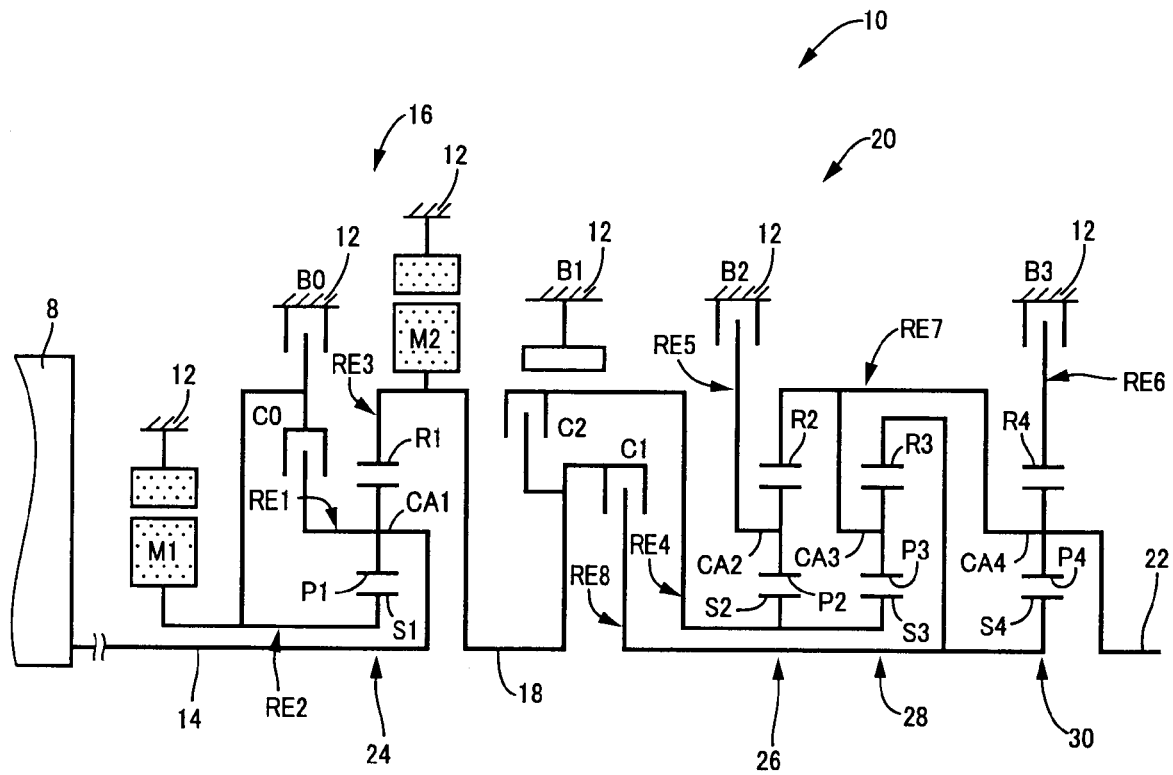
FIG. 1 is a skeleton view explaining a structure of a drive apparatus for hybrid vehicle of one embodiment according to the present invention.
FIG. 2 is an operation Table indicating a relation between a shifting operation of the drive apparatus of the hybrid vehicle of the embodiment shown in FIG. 1 operable in a continuously variable shifting state or a step-variable shifting state, and operation combinations of hydraulic-type frictionally coupling devices used therefor.

FIG. 1 is a skeleton view explaining a shifting mechanism 10 constructing a part of a drive apparatus of a hybrid vehicle according to one embodiment of the present invention. The shifting mechanism 10 includes an input shaft 14, a differential portion 11, an automatic transmission i.e., automatic transmission part 20, and an output shaft 22 all coaxially disposed in a transmission case 12 (hereinafter briefly referred to as "case 12") as a non-rotatable member fixed to a vehicle body. The input shaft 14 as an input rotation member is fixed to the case 12. The differential portion 11 is connected to the input shaft 14 directly or indirectly via a pulsation absorbing damper (vibration damping device) not shown. The automatic transmission 20 functioning as a step-variable type transmission is disposed between the differential mechanism 11 and the output shaft 22 to be connected thereto in series. The output shaft 22 as an output rotation member is connected to the automatic transmission 20.

This shifting mechanism 10 is suitably used for a transverse FR vehicle (front-engine, rear-drive vehicle), and is disposed between a drive power source in the form of an engine 8 such as a gasoline engine or a diesel engine, and a pair of drive wheels 38 (FIG. 5), to transmit a vehicle drive force to the pair of drive wheels 38 through a differential gear device 36 (final speed reduction gear) and a pair of drive axles.

In the shifting mechanism 10 of this embodiment, the engine 8 and the differential portion 11 is directly connected. Here, the direct connection includes, in addition to a connection without using any fluid-type transmitting device such as a torque converter or fluid coupling, a connection with using vibration damping device. Noted that a lower half of the shifting mechanism 10 constructed symmetrically with respect to its axis, is omitted in FIG. 1. This is true for other embodiments to be explained hereinafter.

The differential portion 11 includes a first electric motor M1, a power distributing mechanism 16 and a second electric motor M2. The power distributing mechanism 16 is a mechanism distributing an output of the engine 8 inputted to the input shaft 14 to the first electric motor M1 and the transmitting member 18, as the differential mechanism. The second electric motor M2 is rotatable integral with the transmitting member 18. The second electric motor M2 may be disposed at any portion of a power transmitting path extending between the transmitting member 18 and the drive wheel 38. In the present embodiment, each of the first electric motor M1 and the second electric motor M2 is a so-called motor/generator also functioning as an electric generator. The first electric motor M1 should function at least as an electric generator to generate an electric energy with generating a reaction force, and the second electric motor M2 should function at least as an electric motor to generate a drive force of the vehicle.

The power distributing mechanism 16 includes a first planetary gear unit 24 functioning as a differential device, a switching clutch C0 and a switching brake B1. The first planetary gear unit 24 of single pinion type has a gear ratio ρ1 of about 0.418, for example. It has, as rotating elements, a first sun gear S1, a first planetary gear P1, a first carrier CA1 supporting the first planetary gear P1 to be rotatable about its axis and about the axis of the first sun gear S1, and a first ring gear R1 meshing with the first sun gear S1 through the first planetary gear P1. Representing the numbers of teeth of the first sun gear S1 and the first ring gear R1 by ZS1 and ZR1, respectively, the above gear ratio ρ1 is represented by ZS1/ZR1.

In the power distributing mechanism 16, the first carrier CA1 is connected to the drive apparatus input shaft 14, i.e., to the engine 8, the first sun gear S1 is connected to the first electric motor M1, and the first ring gear R1 is connected to the transmitting member 18. The switching brake B0 is disposed between the first sun gear S1 and the casing 12, and the switching clutch C0 is disposed between the first sun gear S1 and the first carrier CA1. Upon release of both the switching clutch C0 and switching brake B0, the power distributing mechanism 16 is placed in the differential state where the first sun gear S1, first carrier CA1 and first ring gear R1 of the first planetary gear unit 24 are placed in a differential state to be rotatable relative to each other to perform a differential function. Thus, the output of the engine 8 is distributed to the first electric motor M1 and the transmitting member 18, and a part of the output distributed to the first electric motor M1 is used to generate and store power thereat or to drive the second electric motor M2.

Accordingly, the differential portion 11 (power distribution mechanism 16) functions as the electrically controlled differential device, for example, in the continuously variable shifting state (electrically controlled CVT state), in which the rotating speed of the transmitting member 18 changes continuously, irrespective of the rotating speed of the engine 8. That is, the differential portion 11 placed in the continuously variable state by the differential state of the power distributing mechanism 16 functions as the electrically controlled continuously variable transmission i.e., continuously variable transmission part in which speed ratio $\gamma 0$ (rotating speed of the driving device input shaft 14/rotating speed of the transmitting member 18) electrically changes from a minimum value $\gamma 0$ min to a maximum value $\gamma 0$ max.

In this state, by engagement of the switching clutch C0 or switching brake B0, the power distributing mechanism 16 is placed to the non-differential state not to perform, that is impossible to perform the differential operation. Specifically, when the first sun gear S1 and the first carrier CA1 are engaged i.e., coupled integrally by engagement of the switching clutch C0, the rotating elements of the first planetary gear unit 24 including the first sun gear S1, first carrier CA1 and first ring gear R1 are placed in a locked state or a non-differential state to be rotatable as a unit. With this, also the differential portion 11 is placed to the non-differential state. Thus, the rotating speeds of the engine 8 and the power transmitting member 18 coincides with each other, so that the differential portion 11 (power distributing mechanism 16) is placed in a fixed shifting state, that is a step-variable shifting state functioning as the transmission having a fixed speed ratio $\gamma 0$ equal to 1.

Then, when the switching brake B0 is engaged instead of the switching clutch C0 to connect the first sun gear S1 with the case 12, the power distributing mechanism 16 is placed in a locked state or non-differential state impossible to perform the differential operation or action with the non-rotating state of the first sun gear St. With this, also the differential portion 11 is placed in the non-differential state. Due to the higher rotating speed of the first ring gear R1 than that of the first carrier CA1, the power distributing mechanism 16 functions as a speed-increasing mechanism. The differential portion 11 (power distributing mechanism 16) is placed in the fixed shifting state, i.e., the step-variable shifting state functioning as the speed-increasing mechanism of which a speed ratio $\gamma 0$ is fixed in a value smaller than 1, for example, about 0.7.

In the present embodiment, the switching clutch C0 and switching brake B0 selectively place the differential portion 11 (power distributing mechanism 16) to the differential state i.e., non-locked state, and in the non-differential state i.e., the locked state. In detail, in the differential state, the differential portion 11 (power distributing mechanism 16) is operable as the electrically controlled differential device. For example, in the continuously variable shifting state, it is operable as the continuously variable transmission of which shifting ratio is continuously variable.

The switching clutch C0 and switching brake B0 also place the differential portion 11 (power distributing mechanism 16) in the shifting state not operable as the electrically controlled differential device. For example, in the locked state with the shifting ratio being locked in the fixed value, the differential portion 11 (power distributing mechanism 16) is not operable as the continuously variable transmission, with the continuously variable shifting operation being inoperative. In other words, in the locked state, the differential portion 11 (power distributing mechanism 16) operates as the single-stage or multi-stage transmission having one or not less than two shifting ratio(s), not operative as the continuously variable transmission, with the continuously variable shifting operation being inoperative. The locked state can otherwise be expressed as the fixed shifting state where the differential portion 11 (power distributing mechanism 16) operates as the single-stage or multi-stage transmission having one or not less than two shifting ratio(s).

The automatic transmission 20 includes plural planetary gear units, that is a single-pinion type second planetary gear unit 26, a single-pinion type third planetary gear unit 28 and a single-pinion type fourth planetary gear unit 30. The second planetary gear unit 26 includes a second sun gear S2, a second planetary gear P2, a second carrier CA2 supporting the second planetary gear P2 to be rotatable about its axis and about the axis of the second sun gear S2, and a second ring gear R2 meshing with the second sun gear S2 through the second planetary gear P2, having for example a gear ratio $\rho 2$ of about 0.562. The third planetary gear unit 28 includes a third sun gear S3, a third planetary gear P3, a third carrier CA3 supporting the third planetary gear P3 to be rotatable about its axis and about the axis of the third sun gear S3, and a third ring gear R3 meshing with the third sun gear S3 through the third planetary gear P3, having for example a gear ratio $\rho 3$ of about 0.425.

The fourth planetary gear unit 30 includes a fourth sun gear S4, a fourth planetary gear P4, a fourth carrier CA4 supporting the fourth planetary gear P4 to be rotatable about its axis and about the axis of the fourth sun gear S4, and the fourth ring gear R4 meshing with the fourth sun gear S4 through the fourth planetary gear P4, having a gear ratio $\rho 4$ of about 0.421. Representing the numbers of teeth of the second sun gear S2, second ring gear R2, third sun gear S3, third ring gear R3, fourth sun gear S4 and fourth ring gear R4 by ZS2, ZR2, ZS3, ZR3, ZS4 and ZR4 respectively, the above gear ratios $\rho 2$, $\rho 3$ and $\rho 4$ are represented by ZS2/ZR2, ZS3/ZR3, and ZS4/ZR4, respectively.

In the automatic transmission 20, the second sun gear S2 and the third sun gear S3 integrally fixed to each other as a unit are selectively connected to the transmitting member 18 through a second clutch C2, and are selectively fixed to the casing 12 through a first brake B1. The second carrier CA2 is selectively connected to the casing 12 through the second brake B2, and the fourth ring gear R4 is selectively fixed to the transmission casing 12 through a third brake B3. The second ring gear R2, third carrier CA3 and fourth carrier CA4 integrally fixed to each other are fixed to the output shaft 22. The third ring gear R3 and the fourth sun gear S4 integrally fixed to each other are selectively connected to the transmitting member 18 through a first clutch C1.

Thus, the automatic transmission 20 and the transmitting member 18 are selectively connected to each other through the first clutch C1 or the second clutch C2 used for establishing the gear shift position in the automatic transmission 20. In other words, the first clutch C1 and the second clutch C2 function as the coupling device between the transmitting member 18 and the automatic transmission 20. That is, it selectively switches the power transmitting path between the differential portion 11 (transmitting member 18) and the drive wheel 38 in a power transmitting condition allowing the power transmission therethrough, and a power interrupting condition interrupting the power transmission therethrough.

That is, engagement of at least one of the first clutch C1 and the second clutch C2 bring the power transmitting path into the power transmitting condition, while release of both the first clutch C1 and the second clutch C2 bring the power transmitting path into the power interrupting condition.

The switching clutch C0, the first clutch C1, the second clutch C2, the switching brake B0, the first brake B1, the second brake B2 and the third brake B3 are hydraulic-type frictionally coupling devices used in a conventional vehicular automatic transmission. The frictionally coupling device includes a wet-type multiple-disc clutch in which a plurality of friction plates superposed on each other are forced against each other by a hydraulic actuator, or a band brake in which a rotary drum and one band or two bands wound on an outer circumferential surface thereof is tightened at one end by a hydraulic actuator.

In the shifting mechanism 10 thus constructed, as shown in an operation Table of FIG. 2, one of a first-gear position (first-speed position) through a fifth-gear position (fifth-speed position), a reverse-gear position (rear-drive position) and a neural position is selectively established by engagement of the switching clutch C0, the first clutch C1, the second clutch C2, the switching brake B0, the first brake B1, the second brake B2 and the third brake B3. Those positions have respective speed ratios γ (input shaft speed $N_{IN}$/output shaft speed $N_{OUT}$) which change as geometric series.

In particular, in this embodiment, by engagement of any of the switching clutch C0 and switching brake B0 provided in the power distributing mechanism 16, the differential portion 11 can construct, in addition to the continuously variable shifting state operable as the continuously variable transmission, the fixed shifting state operable as the transmission of the fixed shifting ratio.

Accordingly, in the shifting mechanism 10, the differential portion 11 placed in the fixed shifting state by engagement of any of the switching clutch C0 and switching brake B0, and the automatic transmission 20 construct the step variable shifting state operable as the step-variable transmission. The differential portion 11 placed in the continuously variable shifting state by non-engagement of both the switching clutch C0 and switching brake B0, and the automatic transmission 20 construct the continuously variable shifting state operable as the continuously variable transmission. In other words, the shifting mechanism 10 is switched to the step-variable shifting state by engagement of any of the switching clutch C0 and switching brake B0, and is switched to the continuously variable shifting state by non-engagement of both the switching clutch C0 and switching brake B0. The differential portion 11 is the transmission also switched to the step-variable shifting state and the continuously variable shifting state.

For example, when the shifting mechanism 10 functions as the step-variable transmission, for example, as shown in FIG. 2, engagement of the switching clutch C0, the first clutch C1 and the third brake B3 establish the first-gear position having the highest speed ratio γ1 of about 3.357, for example, and engagement of the switching clutch C0, the first clutch C1 and the second brake B2 establish the second-gear position having the speed ratio γ2 of about 2.180, for example, which is lower than the speed ratio γ1. Further, engagement of the switching clutch C0, first clutch C1 and first brake B1 establish the third-gear position having the speed ratio γ3 of about 1.424, for example, which is lower than the speed ratio γ2, and engagement of the switching clutch C0, first clutch C1 and second clutch C2 establish the fourth-gear position having the speed ratio γ4 of about 1.000, for example, which is lower than the speed ratio γ3.

Engagement of the first clutch C1, second clutch C2 and switching brake B0 establish the fifth-gear position having the speed ratio γ5 of about 0.705, for example, which is smaller than the speed ratio γ4. Further, engagement of the second clutch C2 and the third brake B3 establish the reverse-gear position having the speed ratio γR of about 3.209, for example, which positions between the speed ratios γ1 and γ2. The neutral position N is established by engaging only the switching clutch C0.

However, when the shifting mechanism 10 functions as the continuously variable transmission, as shown in FIG. 2, the switching clutch C0 and the switching brake B0 are both released. With this, the differential portion 11 functions as the continuously variable transmission, and the automatic transmission 20 connected in series thereto functions as the step-variable transmission. The rotating speed to be input to the automatic transmission 20 placed in one of the first-gear, second-gear, third-gear and fourth-gear positions, that is the rotating speed of the transmitting member 18 is continuously changed so that the continuous shifting ratio width can be obtained for each of the gear positions. Accordingly, since the speed ratio of the automatic transmission 20 is continuously variable across the adjacent gear positions, a total speed ratio γT (overall speed ratio) of the shifting mechanism 10 is continuously variable.

Figure 3:
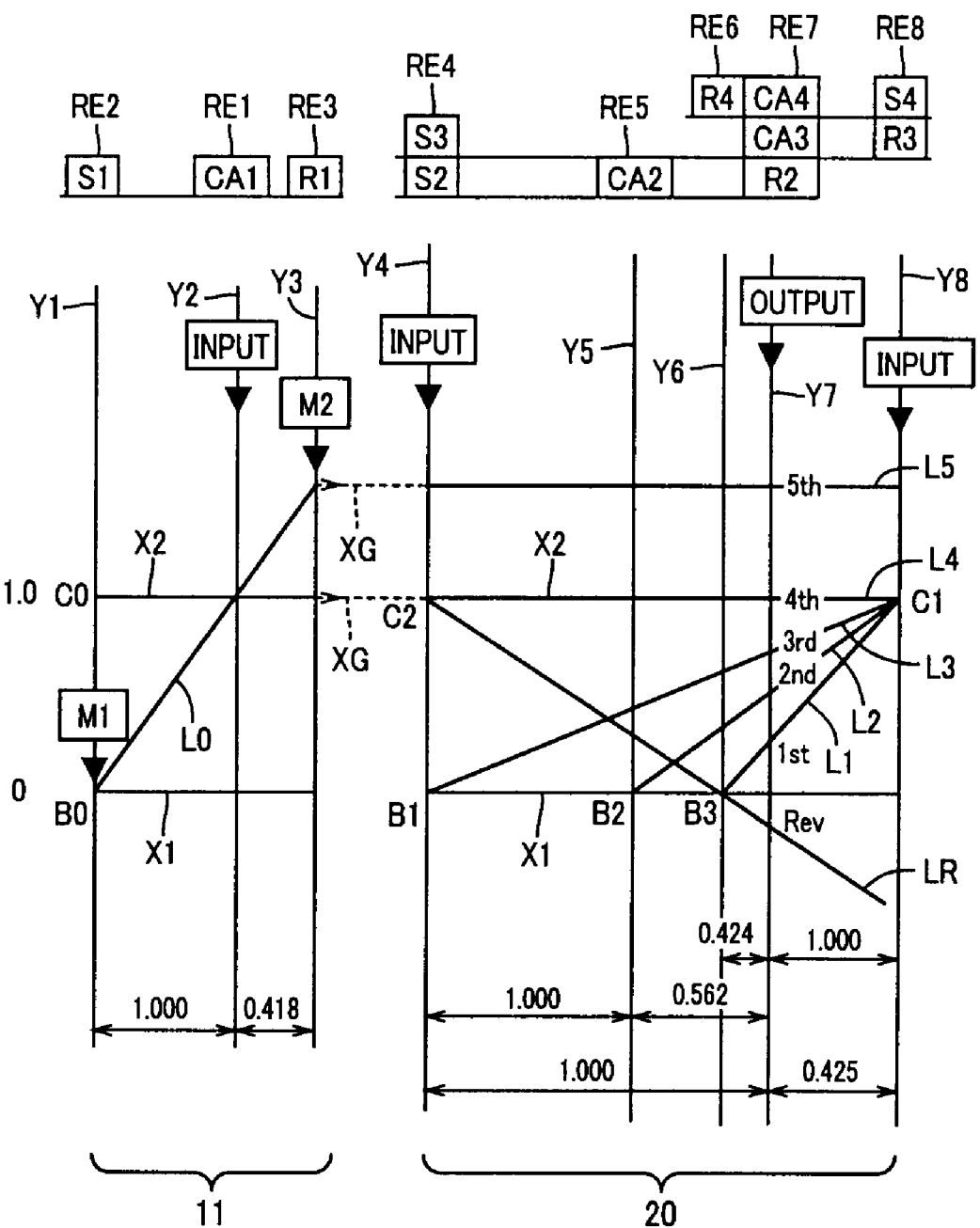
FIG. 3 is a collinear chart showing relative rotating speeds of rotating elements in each of different gear positions when the drive apparatus of the hybrid vehicle of the embodiment shown in FIG. 1 is operated in the step-variable shifting state.

FIG. 3 shows a collinear chart representing by straight lines a relation among the rotating speeds of the rotating elements different in each of the gear positions of the shifting mechanism 10. The shifting mechanism 10 is constituted by the differential portion 11 functioning as the continuously variable shifting portion or first shifting portion, and the automatic transmission 20 functioning as the step-variable shifting portion or second shifting portion. The collinear chart of FIG. 3 is a rectangular two-dimensional coordinate system in which the gear ratios ρ of the planetary gear units 24, 26, 28 and 30 are taken along the horizontal axis, while the relative rotating speeds of the rotating elements are taken along the vertical axis. A lower one X1 of three horizontal lines indicates the rotating speed of 0, and an upper one X2 indicates the rotating speed of 1.0, that is, an operating speed $N_E$ of the engine 8 connected to the input shaft 14. The horizontal line XG indicates the rotating speed of the transmitting member 18.

Among three vertical lines Y1, Y2 and Y3 corresponding to the three elements of the differential portion 11, respectively represent from the left the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined corresponding to the gear ratio ρ1 of the first planetary gear unit 24.

Further, five vertical lines Y4, Y5, Y6, Y7 and Y8 corresponding to the automatic transmission 20 respectively represent from the left the relative rotating speeds of a fourth rotary element (fourth element) RE4, a fifth rotary element (fifth element) RE5, a sixth rotary element (sixth element) RE6, a seventh rotary element (seventh element) RE7, and an eighth rotary element (eighth element) RE8. The fourth rotary element RE4 has a form of the second and third sun gears S2, S3 integrally fixed to each other, the fifth rotary element RE5 has a form of the second carrier CA2, and the sixth rotary element RE6 has a form of the fourth ring gear R4. The seventh rotary element RE7 has a form of the second ring gear R2 and third and fourth carriers CA3, CA4 integrally fixed to each other, and the eighth rotary element RE8 has a form of the third ring gear R3 and fourth sun gear S4 integrally fixed to each other.

The distances between the adjacent ones of the vertical lines Y4 to Y8 are determined by the gear ratios ρ2, ρ3 and ρ4 of the second, third and fourth planetary gear units 26, 28 and 30. That is, as shown in FIG. 3, for each of the second, third and fourth planetary gear units 26, 28 and 30, the distances between the sun gear and carrier corresponds to "1", and the distances between the carrier and ring gear corresponds to the gear ratio ρ.

Expressing with the collinear chart of FIG. 3, the shifting mechanism 10 of this embodiment is, in the power distribution mechanism 16 (continuously variable shifting portion 11), arranged such that the first rotary element RE1 (the first carrier CA1), which is one of the three rotating elements of the first planetary gear unit 24, is fixed to the input shaft 14, and selectively connected to the second rotary element RE 2 (first sun gear S1) as another rotary element through the switching clutch C0. The second rotary element RE2 is fixed to the first electric motor M1 and selectively fixed to the casing 12 through the switching brake B0. The third rotary element RE3 (the first ring gear R1) as still another rotary element is fixed to the transmitting member 18 and the second electric motor M2. Thus, rotation of the input shaft 14 is transmitted (inputted) to the automatic transmission (step-variable transmission portion) 20 through the transmitting member 18. An inclined straight line L0 which passes an intersection point between the lines Y2 and X2 represents a relation between the rotating speeds of the first sun gear S1 and the first ring gear R1.

For example, when the differential portion 11 is switched to the continuously variable shifting state (differential state) by release of both the switching clutch C0 and the switching brake B0, the rotation of the first sun gear S1, indicated by the intersection of the straight line L0 and the vertical line Y1, is raised or lowered by controlling the reaction force due to electric generation by the first electric motor M. The rotating speed of the first ring gear R1, indicated by the intersection of the straight line L0 and the vertical line Y3, is consequently lowered or raised. Also, when the first sun gear S1 and the first carrier CA1 are connected by the engagement of the switching clutch C0, the power distributing mechanism 16 is placed in the non-differential state in which the three rotating elements rotate integrally. Thus, the straight line L0 coincides with the horizontal line X2, and the transmitting member 18 rotates at the same rotating speed as the engine rotating speed $N_E$.

Alternately, when the rotation of the first sun gear S1 is stopped by the engagement of the switching brake B0, the power distributing mechanism 16 is placed in the non-differential state to function as a speed-increasing mechanism. The straight line L0 is set in the state shown in FIG. 3. The rotating speed of the first ring gear R1, that is the transmitting member 18, indicated by the intersection of the straight line L0 and the vertical line Y3, is inputted into the automatic transmission 20 at a level that is increased, compared with the engine rotating speed $N_E$.

In the automatic transmission 20, the fourth rotary element RE4 is selectively connected to the transmitting member 18 through the second clutch C2 and selectively fixed to the casing 12 through the first brake B1, the fifth rotary element RE5 is selectively fixed to the casing 12 through the second brake B2, and the sixth rotary element RE6 is selectively fixed to the casing 12 through the third brake B3. The seventh rotary element RE7 is fixed to the output shaft 22, and the eighth rotary element RE8 is selectively connected to the transmitting member 18 through the first clutch C1.

As shown in FIG. 3, in the automatic transmission 20, upon engagement of the first clutch C1 and the third brake B3, the rotating speed of the output shaft 22 in the first-speed position is represented by an intersection point between the inclined linear line L1 and the vertical line Y7. Here, the inclined straight line L1 passes an intersection point between the vertical line Y8 indicative of the rotating speed of the eighth rotary element RE8 and the horizontal line X2, and an intersection point between the vertical line Y6 indicative of the rotating speed of the sixth rotary element RE6 and the horizontal line X1.

Similarly, the rotating speed of the output shaft 22 in the second-speed position is represented by an intersection point between an inclined straight line L2 determined by engagement of the first clutch C1 and second brake B2, and the vertical line Y7 indicative of the rotating speed of the seventh rotary element RE7 fixed to the output shaft 22. The rotating speed of the output shaft 22 in the third-speed position is represented by an intersection point between an inclined straight line L3 determined by engagement of the first clutch C1 and first brake B1, and the vertical line Y7 indicative of the rotating speed of the seventh rotary element RE7 fixed to the output shaft 22. The rotating speed of the output shaft 22 in the fourth-speed position is represented by an intersection point between a horizontal line L4 determined by engagement of the first clutch C1 and second clutch C2, and the vertical line Y7 indicative of the rotating speed of the seventh rotary element RE7 fixed to the output shaft 22.

In the first-speed through fourth-speed positions, as result of engagement of the switching clutch C0, power from the differential portion 11 i.e., the power distributing mechanism 16 is inputted to the eighth rotary element RE8 with the rotating speed the same as that of the engine speed $N_E$. However, when the switching clutch B0 engages instead of the switching clutch C0, since power from the differential portion 11 is inputted to the eighth rotary element RE8 with a speed higher than the engine speed $N_E$, the rotating speed of the output shaft 22 in the fifth-speed position is represented by an intersection point between a horizontal line L5 and the vertical line Y7. Here, the horizontal line L5 is determined by engagement of the first clutch C1, second clutch C2 and switching brake B0, and the vertical line Y7 indicates the rotating speed of the seventh rotary element RE7 fixed to the output shaft 22.

Figure 4:
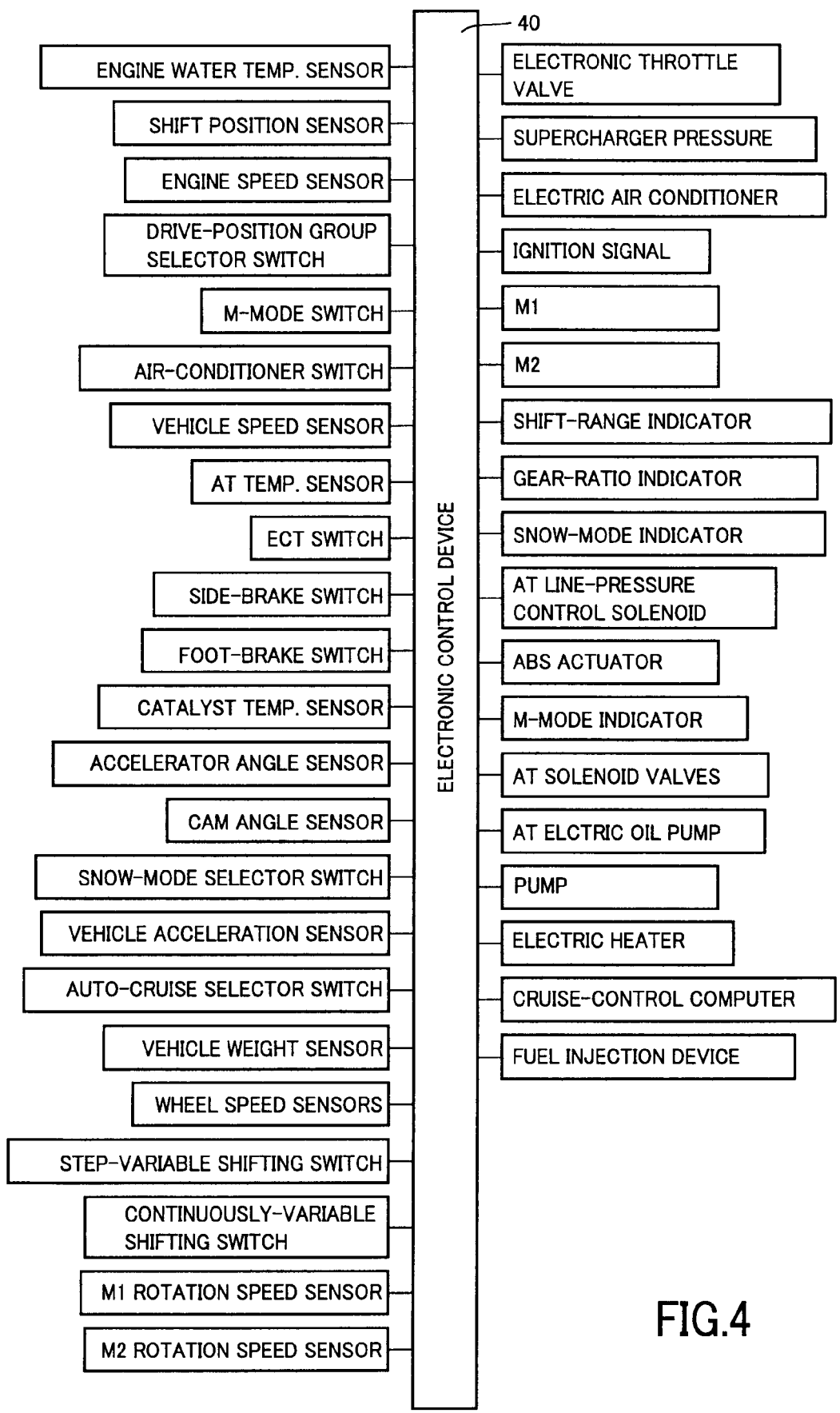
FIG. 4 is a view explaining input and output signals of an electronic control device provided in the drive apparatus of the embodiment shown in FIG. 1.

FIG. 4 illustrates signals input to an electronic control device 40 and signals output therefrom to control the shifting mechanism 10. This electronic control device 40 includes a so-called microcomputer incorporating a CPU, a ROM, a RAM and an input/output interface. By performing signal processing according to programs stored in the ROM utilizing a temporary data storage function of the ROM, it implements hybrid drive controls of the engine 8 and electric motors M1 and M2, and drive controls such as shifting controls of the automatic transmission 20.

To the electronic control device 40, from various sensors and switches shown in FIG. 4, various signals are inputted, which include a signal indicative of a temperature $TEMP_W$ of cooling water of the engine, a signal indicative of a selected operating position $P_{SH}$ of a shift lever, a signal indicative of the operating speed $N_E$ of the engine 8, a signal indicative of a set value of gear ratio row, a signal indicative of a command for M mode (motor drive mode), a signal indicative of an operated state of an air conditioner, a signal indicative of a vehicle speed V corresponding to the rotating speed $N_{OUT}$ of the output shaft 22, a signal indicative of a working oil temperature of the automatic transmission 20, a signal indicative of an operated state of a side brake, a signal indicative of an operated state of a foot brake, a signal indicative of a catalyst temperature, a signal indicative of an opened amount $A_{CC}$ of an accelerator pedal, a signal indicative of a cam angle, a signal indicative of a snow drive mode, a signal indicative of a longitudinal acceleration value of the vehicle, and a signal indicative of an auto-cruising drive mode.

Also inputted are a signal indicative of a vehicle weight, a signal indicative of wheel speed of each drive wheel, a signal indicative of operation of a step-variable switch for changing the differential portion 11 (power transmitting mechanism 16) to the step-variable shifting state (locked state) so that the shifting mechanism 10 functions as the step-variable transmission, a signal indicative of operation of a continuous-variable switch for changing the differential portion 11 (power transmitting mechanism 16) to the continuously variable shifting state (differential state) so that the shifting mechanism 10 functions as the continuously variable transmission, a signal indicative of the rotating speed $N_{M1}$ of the first electric motor M1, and a signal indicative of the rotating speed $N_{M2}$ of the second electric motor M2.

From the electronic control device 40, various control signals are outputted to the engine output control device 43 (refer to FIG. 5) which controls the engine output, which includes a signal to drive a throttle actuator 97 for controlling an opening degree $\theta_{TH}$ of a throttle valve 96 disposed in a suction tube 95 of the engine 8, a signal to control fuel supply amount to each cylinder of the engine 8 and the suction tube 95 by a fuel injection tube 98, a signal to command an ignition timing in the engine 8 by an ignition device 99, a signal to adjust a supercharger pressure, a signal to operate the electric air conditioner, a signal for controlling an ignition timing of the engine 8, signals to operate the electric motors M1 and M2, a signal to operate a shift-range indicator for indicating the selected operating position of the shift lever, a signal to operate a gear-ratio indicator for indicating the gear ratio, a signal to operate a snow-mode indicator for indicating the selection of the snow drive mode, a signal to operate an ABS actuator for anti-lock braking of the wheels, and a signal to operate an M-mode indicator for indicating the selection of the M-mode.

Also outputted are signals to operate solenoid-operated valves incorporated in a hydraulic control unit 42 provided to control the hydraulic actuators of the hydraulically operated frictional coupling devices of the differential portion 11 and the automatic transmission 20, a signal to operate an electric oil pump used as a hydraulic pressure source for the hydraulic control unit 42, a signal to drive an electric heater, a signal to be applied to a cruise-control computer, and a signal indicative of an fuel injection device.

Figure 5:
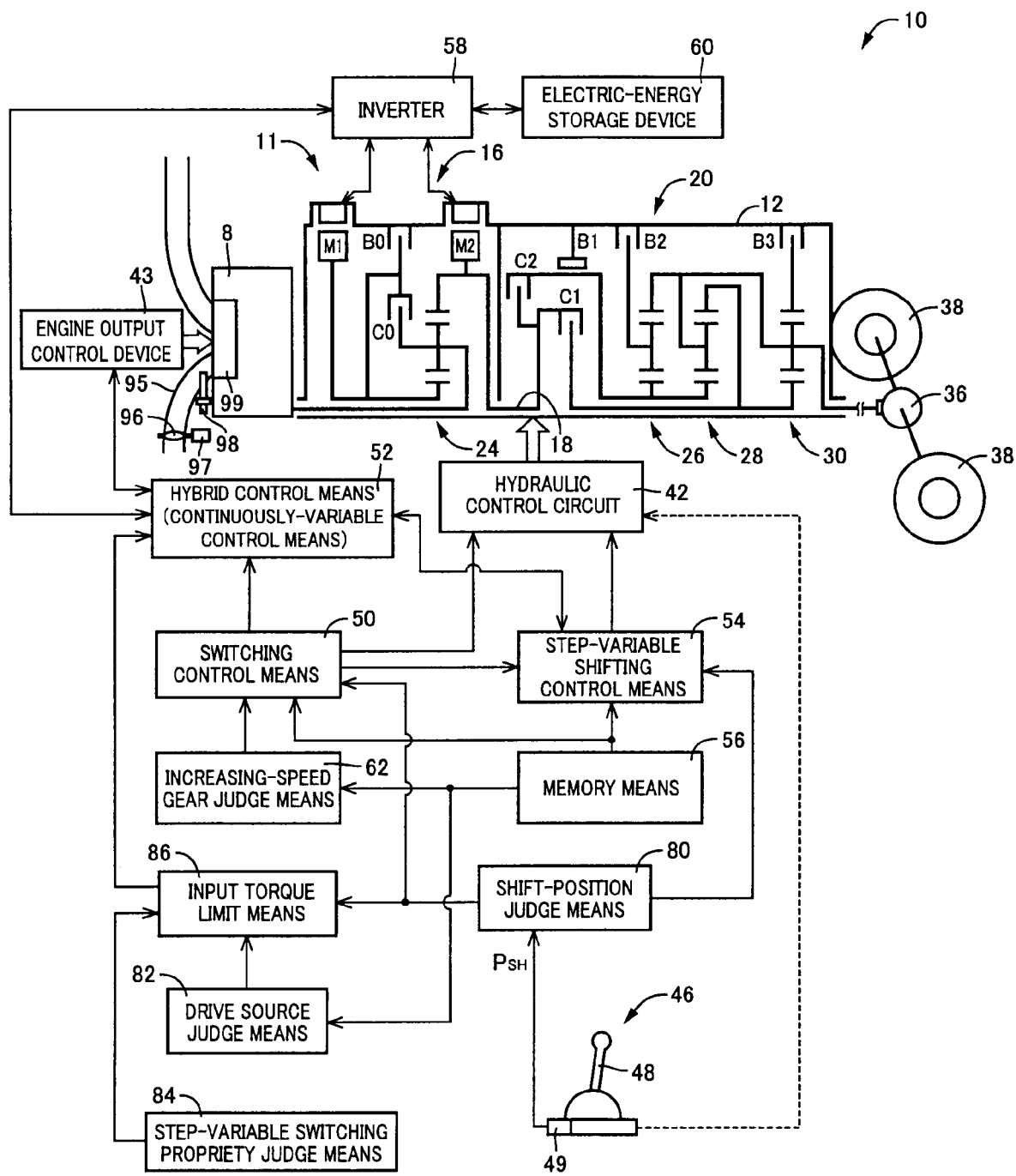
FIG. 5 is a functional block diagram for describing a main portion related to control operation by the electronic control device of FIG. 4.
Figure 6:
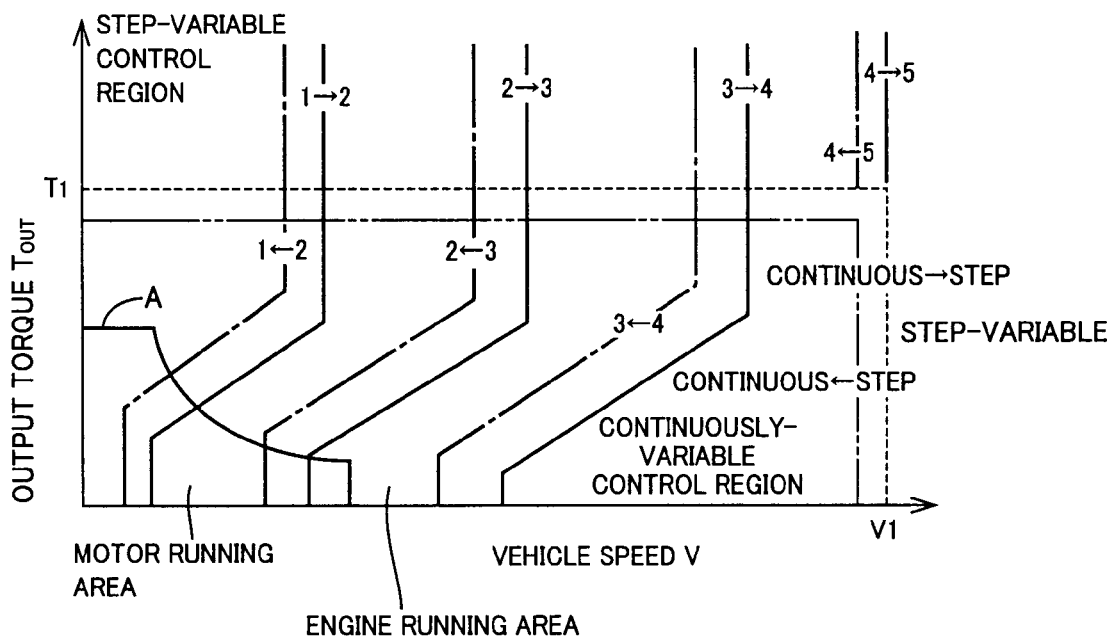
FIG. 6 is a view showing a relationship of a shifting diagram, a switching diagram and a example of a drive source switching diagram, being drawn on the same two-dimensional coordinate system having vehicle speed and output torque as parameters. The shifting diagram serves as a basis for shifting judgment of an automatic transmission and stored in advance, the switching diagram serves as a basis for switching judgment of a shifting state of a shifting mechanism and stored in advance, and the drive source switching diagram includes a boundary line between an engine running area and a motor running area for switching between engine running and motor running and stored in advance.

FIG. 5 is a functional block diagram for illustrating an essential part of a control function to be performed with the electronic control device 40. In FIG. 5, the step-variable shifting control means 54 functions as shifting control means for performing the gear shifting in the automatic transmission 20. For instance, the step-variable shifting control means 54 discriminates whether to perform the gear shifting in the automatic transmission 20 on the basis of the vehicle condition indicative of the vehicle speed V and the required output torque $T_{out}$ for the automatic transmission 20 by referring to the relations (including the shifting diagram and the shifting map), preliminarily stored in the memory means 56, which are shown in FIG. 6 in solid lines and single dot lines.

That is, the step-variable shifting control means 54 discriminates a shifting position, for which the gear shifting is performed with the automatic transmission 20, to allow the automatic transmission 20 to perform the gear shifting so as to obtain the discriminated shifting position. When this takes place, the step-variable shifting control means 54 outputs a command (shifting output command) to a hydraulic control circuit 42 for coupling and/or uncoupling the hydraulically operated frictional coupling device, excepting the switching clutch C0 and the switching brake B0, so as to achieve a desired shifting position in accordance with, for instance, the operation Table shown in FIG. 2.

Hybrid control means 52 renders the engine 8 operative in an operating region at high efficiency under the continuously variable shifting state of the shifting mechanism 10, that is, the differential state of the differential portion 11. Meanwhile, the hybrid control means 52 allows the rates of drive force being distributed to the engine 8 and the second electric motor M2 and a reactive force of the first electric motor M1 due to the operation thereof for generating electric power to be varied to optimum values, thereby controlling a speed ratio γ0 of the differential portion 11 placed as an electrically controlled continuously variable transmission. For instance, the hybrid control means 52 calculates a target (demanded) output of the vehicle by referring to the displacement value Acc of an accelerator pedal and the vehicle speed V indicative of the amount of output required by a vehicle driver at the current running speed of the vehicle.

Then, the hybrid control means 52 calculates a demanded total target output based on the target output of the vehicle and a charging request value. In order to obtain the total target output, the hybrid control means 52 calculates a target engine output with taking account of the transmitting loss, loads on auxiliary units, the assisting torque of the second electric motor M2, etc. Then, the hybrid control means 52 controls the engine 8 so as to provide the engine speed $N_E$ and the engine torque $T_E$ such that the target engine output is obtained, while controlling the amount of electric power being generated by the first electric motor M1. In other words, hybrid control means 52 controls the electricity-generating amount at the first electric motor M1 to control the engine rotation speed $N_D$, even for the same vehicle speed, the same gear ratio of the automatic transmission 20 that is the same rotation speed of the transmitting member 18.

The hybrid control means 52 performs hybrid control with taking account of the gear position of the automatic transmission 20 to obtain drive power performance while improving fuel consumption. Such hybrid control allows the differential portion 11 to function as the electrically controlled continuously variable transmission so as to allow the engine speed $N_E$, determined for the engine 8 to operate at a high efficiency, to match the rotating speed of the transmitting member 18 that is determined based on the vehicle speed V and the selected gear position of the automatic transmission 20.

That is, the hybrid control means 52 preliminarily stores therein an optimum fuel economy curve (including the fuel economy map and the relations) that is preliminarily determined on an experimental basis. This allows a compromise to be obtained, during the running of the vehicle under the continuously variable shifting state, between drivability of the vehicle and fuel economy performance of the engine 8 on the two-dimensional coordinate with the parameters including, for instance, the engine speed $N_E$ and the output torque (engine torque) $T_E$ of the engine 8. Thus, the hybrid control means 52 determines a target value of the total speed ratio γT of the shifting mechanism 10 so as to obtain the engine torque $T_E$, causing the engine to generate an output required for satisfying, for instance, the target output (overall target output and required drive force), and the engine speed $N_E$. This enables the engine 8 to operate on the optimum fuel economy curve. Then, the hybrid control means 52 controls the speed ratio γ0 of the differential portion 11 so as to achieve the target value. This allows the total speed ratio γT to be controlled within a variable shifting range, for instance, from 13 to 0.5.

During such hybrid control, the hybrid control means 52 allows electric energy generated by the first electric motor M1 to be supplied to an electric-energy storage device 60 and the second electric motor M2 through an inverter 58. This allows a major portion of the drive force of the engine 8 to be mechanically transmitted to the transmitting member 18. When this takes place, a portion of the drive force of the engine is consumed with the first electric motor M1 for generating electric power to be converted to electric energy. The electric energy is supplied through the inverter 58 to the second electric motor M2, which in turn is driven to transfer the drive force from the second electric motor M2 to the transmitting member 18. Equipment, related to the operations from a phase of generating the electric energy to a phase in which the electric energy is consumed with the second electric motor M2, constitutes an electric path in which the portion of the drive force of the engine 8 is converted to the electric energy which in turn is converted to the mechanical energy.

The hybrid control means 52 functionally includes engine output control means. The engine output control means allows a throttle actuator 97 to perform throttle control so as to open or close an electronic throttle valve 96. In addition, the engine output control means allows a fuel injection device 98 to control a fuel injection quantity and fuel injection timing for performing fuel injection control. Further, the engine output control means outputs commands to the engine output control device 43 independently or in combination. This allows the engine 8 to perform output control so as to fundamentally provide the required engine output. For instance, the hybrid control means 52 drives the throttle actuator 60 in response to an acceleration opening signal Acc by referring to the preliminarily stored relation, which is not shown, such that the greater the accelerator opening Acc, the greater will be the throttle valve opening $\theta_{TH}$.

Also, the engine output control device 43 controls the opening/closing of the electronic throttle valve 96 by the throttle actuator 97 to perform throttle control in accordance with instructions or command of the hybrid control means 52. Besides this, the engine output control device 43 controls fuel injection by the fuel injector 98 to perform fuel injection control, controls the ignition timing by the igniter or other ignition device 99 to perform ignition timing control, etc., and thereby executes engine torque control.

The hybrid control means 52 drives the second electric motor M2 by supplying electrical energy from the electric-energy storage device 60, besides the electrical energy from the first electrical motor M1, performing torque assistance to assist the power of the engine 8.

Even upon an operation-stopped state of the engine 8, the hybrid control means 52 uses only the electric motor for example the second electric motor M2 as the drive power source for running by the electrically controlled CVT function (differential action) of the differential portion 11. Thus, the vehicle is subjected to the motor starting and the motor running. During this motor starting and motor running, the hybrid control means 52 controls the rotating speed $N_{M1}$ of the first electric motor M1 at a negative rotating speed. It makes the first electric motor M1 run idle, so that the engine rotating speed $N_E$ is maintained at zero or substantially zero by the differential action of the differential portion 11. Dragging of the engine 8 in the non-operating state is thereby suppressed to improve the fuel consumption.

Also, for starting the vehicle using the engine 8 as the drive power source instead of using the motor as described above, that is, for performing the engine starting, the hybrid control means 52 controls the reaction force due to electric generation by the first electric motor M1. With this, the rotating speed of the transmitting member 18 is raised by the differential action of the power distribution mechanism 16 to control engine starting.

A solid line A, shown in FIG. 6, represents a boundary line for the drive power source of the vehicle for starting up/running thereof to be switched to the engine 8 and the electric motor, that is, for instance, the second electric motor M2. In other words, the boundary line is used for switching the so-called engine running area, and the so-called motor running area.

The preliminarily stored relation, having the boundary line (in the solid line A) shown in FIG. 6 for switching the engine running area and the motor running area, represents one example of the drive-force source switching diagram (drive power source map), formed in a two-dimensional coordinate, which takes the vehicle speed V and the output torque $T_{OUT}$, indicative of the drive-force related value, as parameters. Memory means 56 preliminarily stores the drive-force source switching diagram together with, for instance, the solid line and the shifting diagram (shifting map) designated by the single dot line which are shown in FIG. 6.

The hybrid control means 52 determines based on the vehicle condition, represented by the vehicle speed V and the required torque output $T_{OUT}$ by referring to, for instance, the drive-force source switching diagram shown in FIG. 6 to find whether the motor running area or the engine running area is present, thereby effectuating the motor running area or the engine running area. As will be apparent from FIG. 6, the hybrid control means 52 executes the motor running area at the relatively low output torque $T_{OUT}$, that is, the low engine torque $T_E$ in which the engine efficiency is generally lower than that in the high torque region, or the relatively low vehicle speed area in the vehicle speed V, that is, the low load region. The motor starting is normally executed in priority to the engine starting. However, the engine starting may be executed in the vehicle state where the accelerator pedal is depressed so deeply that the required or demanded output torque i.e., the required engine torque $T_E$ exceeds the motor running area in the drive force switch diagram shown in FIG. 6.

Further, the hybrid control means 52 may cause the differential portion 11 to have the electrical CVT function through which the engine 8 can be maintained under the operating state regardless of the halted condition or the low speed condition of the vehicle. For instance, if a drop occurs in a state of charge SOC of the electric-storage device 60 during the halt of the vehicle, the first electric motor M1 needs to generate electric power. In this moment, the drive force of the engine 8 causes the first electric motor M1 to generate electric power while the rotating speed of the first electric motor M1 increases. Thus, even if the rotating speed $N_{M2}$ of the second electric motor M2, uniquely determined with the vehicle speed V, becomes zero (nearly zero) due to the halted condition of the vehicle, the power distributing mechanism 16 performs the differential action. This causes the engine speed $N_E$ to be maintained at a level beyond a rotating speed for autonomous rotation.

Furthermore, the hybrid control means 52 allows the differential portion 11 to perform the electrical CVT function to thereby control the rotating speed $N_{M1}$ of the first electric motor M1 and the rotating speed $N_{M2}$ of the second electric motor M2. This causes the engine speed $N_E$ to be maintained at an arbitrary level of the rotating speeds regardless of the vehicle remaining under the halted or running state. In other words, the hybrid control means 52 controls the rotation speed $N_{M1}$ of the first electric motor M1 and/or the rotation speed $N_{M2}$ of the second electric motor M2, with maintaining the engine rotation speed NE constant or controlling it in the arbitrary rotation speed. For instance, as will be understood from the collinear diagram shown in FIG. 3, when increasing the engine speed $N_E$, the hybrid control means 52 executes the operation to raise the rotating speed $N_{M1}$ of the first electric motor M1 while maintaining the rotating speed $N_{M2}$ of the second electric motor M2, restricted with the vehicle speed V, at a substantially fixed level.

The hybrid control means 52 also cuts off the drive current supplied to the first electric motor M1 and the second electric motor M2 from the electric-energy storage device 60 and via the inverter 58 to put them in a no-load state. In the no-load state, the first electric motor M1 and the second electric motor M2 are enabled to rotate freely, that is undergo idle running, so that the differential portion 11 is placed in a state not transmitting torque, that is in a state equivalent to that in which the power transmitting path in its interior is cut off. In other words, by putting the first electric motor M1 and the second electric motor M2 in the no-load state, the hybrid control means 52 placed the differential portion 11 in a neutral state, in which its power transmitting path is electrically cut off.

Returning to FIG. 5, increasing-speed gear judge means 62 makes a determination on which of the switching clutch C0 and the switching brake B0 is to be coupled i.e., engaged for placing the shifting mechanism 10 in the step-variable shifting state. That is, the determination is made based on the vehicle condition according to, for instance, the shifting diagram, shown in FIG. 6, which is preliminarily stored in the memory means 56, to find whether or not the gear position to be shifted in the shifting mechanism 10 lies in an increasing-speed gear position, for instance, a 5th-speed gear position.

Switching control means 50 for instance determines whether to switch the shifting state of the shifting mechanism 10 (differential portion 11) based on the vehicle condition represented with the vehicle speed V and the required output torque $T_{OUT}$. This determination is made by referring to the relations (shifting diagram and shifting map), preliminarily stored in the memory means 56, which are shown in the dotted line and the double dot line in FIG. 6. That is, the determination is made to find whether the shifting mechanism 10 lies in a continuously variable shifting control region for the continuously variable shifting state or a step-variable shifting control region for the step-variable shifting state. Thus, the determination is made on the shifting state to be switched by the shifting mechanism 10. Then, the switching control means 50 effectuates the switching of the shifting state for selectively placing the shifting mechanism 10 in any one of the continuously variable shifting state and the step-variable shifting state.

More particularly, if the determination is made that the shifting mechanism 10 lies in the step-variable shifting control region, then, the switching control means 50 outputs a command to the hybrid control means 52 disenabling or interrupting the hybrid control or continuously variable shifting control, while permitting the step-variable shifting control means 54 to perform the shifting for the predetermined step-variable shifting operation. When this takes place, the step-variable shifting control means 54 allows the automatic transmission 20 to perform the automatic shifting control in accordance with, for instance, the shifting diagram, shown in FIG. 6, which is preliminarily stored in the memory means 56. For instance, FIG. 2 shows the operation Table, preliminarily stored in the memory means 56, which represents combinations in operation of the hydraulically operated frictional coupling devices, that is, the clutches C0, C1, C2, and the brakes B0, B1, B2 and B3 to be selected in the shifting control. That is, the shifting mechanism 10, that is, the differential portion 11 and the automatic transmission 20, functions as a whole to be the so-called step-variable automatic transmission, thereby establishing the gear positions according to the operation Table shown in FIG. 2.

If the increasing-speed gear judge means 62 determines the 5th-gear position, the switching control means 50 outputs a command to the hydraulic control circuit 42 for uncoupling the switching clutch C0 and coupling the switching brake B0. This causes the differential portion 11 to function as an auxiliary power transmission with a fixed speed ratio $\gamma 0$, for instance, the speed ratio $\gamma 0$ equal to "0.7". Thus, the shifting mechanism 10 can act as a whole to obtain an increasing-speed gear position, that is, a so-called overdrive-gear position with a speed ratio less than 1.0. In contrast, if no 5th-gear position is determined by the increasing-speed gear judge means 62, the switching control means 50 outputs a command to the hydraulic control circuit 42 for coupling the switching clutch C0 and uncoupling the switching brake B0. This causes the differential portion 11 to function as the auxiliary power transmission with the fixed speed ratio $\gamma 0$, for instance, the speed ratio $\gamma 0$ equal to 1. Thus, the shifting mechanism 10 can act as a whole to obtain a decreasing-speed gear position with a speed ratio greater than 1.0.

Thus, the switching control means 50 can perform the switching of the shifting mechanism 10 in the step-variable shifting state and selectively performs the switching for the gear positions of two kinds in either one gear position under the step-variable shifting state. This causes the differential portion 11 to function as the auxiliary power transmission and the automatic transmission 20, connected to the differential portion 11 in series, is caused to function as the step-variable transmission. Thus, the shifting mechanism 10 is caused to function as the so-called step-variable automatic transmission as a whole.

On the contrary, if the determination is made that the shifting mechanism 10 lies in the step-variable shifting control region to be switched to the continuously variable shifting state, the switching control means 50 outputs a command to the hydraulic control circuit 42 for uncoupling both the switching clutch C0 and the switching brake B0. This causes the shifting mechanism 10 to be placed in the continuously variable shifting state for enabling a continuously variable shifting to be performed. Thus, the shifting mechanism 10 can act as a whole to obtain the continuously variable shifting state.

Concurrently, the switching control means 50 outputs a command to the hybrid control means 52 for permitting the hybrid control. In addition, the switching control means 50 outputs a signal to the step-variable shifting control means 54 for fixing the shifting mechanism 10 in the gear position for the predetermined continuously variable shifting state. Or, a signal is outputted to the step-variable shifting control means 54 for permitting the automatic transmission 20 to perform automatic shifting according to, for instance, the shifting diagram, shown in FIG. 6, which are preliminarily stored in the memory means 56. In such a case, the variable-step shifting control means 54 executes the operations as shown in the operation Table of FIG. 2 excepting the coupling operations of the switching clutch C0 and brake B0, thereby performing the automatic shifting.

Thus, the switching control means 50 switches the differential portion 11 to be placed in the continuously variable shifting state to function as the continuously variable transmission. In addition, the automatic transmission 20, connected to the differential portion 11 in series, is caused to function as the step-variable transmission. This results in the occurrence of a drive force with a suitable magnitude. Simultaneously, a continuously variable change occurs in the rotating speed input to the automatic transmission 20, that is, the rotating speed of the transmitting member 18 applied to the automatic transmission 20 for each gear position of the 1st-gear, 2nd-gear, 3rd-gear and 4th-gear positions. Thus, the respective gear positions are established in speed ratios over a continuously variable shifting range. Accordingly, since the speed ratio is continuously variable across the adjacent gear positions, the shifting mechanism 10 can achieve the overall speed ratio γT in the continuously variable shifting state.

To explain about FIG. 6 in detail, FIG. 6 represents the relations (shifting diagram and shifting map) preliminarily stored in the memory means 56 for a determination to be made to perform the gear shifting in the automatic transmission 20. FIG. 6 shows one example of the shifting diagram plotted in a two-dimensional coordinate with parameters in terms of the vehicle speed V and the required output torque $T_{OUT}$ indicative of a drive-force related value. In FIG. 6, a solid line represents an up-shift line and a single dot line represents a downshift line.

Further, in FIG. 6, a broken line represents a determination vehicle speed V1 and a determination output torque T1 for the switching control means 50 to make a determination on the continuously variable control area and the step-variable control area. That is, the broken line in FIG. 6 represents a two determination lines. One is a predetermined high vehicle speed determination line, which forms a series of the determination vehicle speed V1 representing a predetermined high-speed running determination line for determining that the hybrid vehicle lies in the high speed running region. Other is a predetermined high-output running determination line which forms a series of the determination output torque T1 representing a predetermined high-output running determination line for determining the drive-force related value relevant to the hybrid vehicle, that is, for instance, the high output running region for the output torque $T_{OUT}$ of the automatic transmission 20 to mark the high output.

Further, as sown in a double dot line in FIG. 6 in contrast to the broken line indicated therein, a hysteresis is provided for making a determination on the step-variable shifting control region and the continuously variable shifting control region. That is, FIG. 6 represents a preliminarily stored shifting diagram (switching map and relation) for the switching control means 50 to make a regional determination on either the continuously variable control area or the step-variable control area, based on parameters with the vehicle speed V and the output torque $T_{OUT}$ covering the determination vehicle speed V1 and the determination output torque T1. In addition, the memory means 56 may preliminarily store the shifting map, inclusive of such a shifting diagram. Moreover, the shifting diagram may be of the type that includes at least one of the determination vehicle speed V1 and the determination output torque T1 and may include a preliminarily stored shifting diagram with a parameter taking any of the vehicle speed V and the output torque $T_{OUT}$.

The above shifting diagram, the switching diagram or the drive-force source switching diagram or the like may be stored not in the map but in a determination formula for making comparison between the current vehicle speed V and the determination vehicle speed V1, and a determination formula or the like for making comparison between the output torque $T_{OUT}$ and the determination output torque T1. In such a case, the switching control means 50 places the shifting mechanism 10 in the step-variable shifting state when the vehicle condition such as, for instance, the current vehicle speed exceeds the determination vehicle speed V1. In addition, the switching control means 50 places the shifting mechanism 10 in the step-variable shifting state when the vehicle condition such as, for instance, the output torque $T_{OUT}$ of the automatic transmission 20 exceeds the determination output torque T1.

Further, a failure or defective function occurs in a control equipment of an electrical system such as the electric motor or the like for rendering the differential portion 11 operative to act as the electrically controlled continuously variable transmission. For instance, a defective function occurs in the equipment related to the electrical path for the first electric motor M1 to generate electric energy which in turn is converted to mechanical energy. That is, failures or defective functions, resulting from the failures or the exposure to low temperatures, are present in the first electric motor M1, the second electric motor M2, the inverter 58, the electric-storage device 60 and transmission lines or the like for electrical connection of these component parts. Under the vehicle condition encountered with such defective states, even if the vehicle condition lies in the continuously variable control area, the switching control means 50 may have top priority to place the shifting mechanism 10 in the step-variable shifting state for ensuring the vehicle to continue a running state.

The above drive-force related value is a parameter corresponding to the drive force of the vehicle in one-to-one relation, which may be the drive torque or the drive force at the drive wheel 38. In addition, it may be an output torque $T_{OUT}$ of the automatic transmission 20, an engine output torque $T_E$, an acceleration value of the vehicle; an actual value such as the engine output torque $T_E$ calculated based on the operating angle of the accelerator pedal or the opening angle $\theta_{TH}$ of the throttle valve (or intake air quantity, air/fuel ratio or fuel injection amount) and the engine speed $N_E$; or an estimated value such as the engine output torque $T_E$ or required vehicle drive force calculated based on the amount of operation of the accelerator pedal by the vehicle operator or the operating angle of the throttle valve. The vehicle drive torque may be calculated based on not only the output torque $T_{OUT}$, etc., but also the ratio of a differential gear device of and the radius of the drive wheels 38, or may be directly detected by a torque sensor or the like. This is true for each of torques mentioned above.

Further, for instance, if the shifting mechanism 10 is placed in the continuously variable shifting state during the running of the vehicle at a high speed, a deterioration occurs in fuel consumption. Therefore, to address such an issue, the vehicle speed V1 is set such that the shifting mechanism 10 is placed in the step-variable shifting state during the vehicle running at the high speed. Furthermore, if the first electric motor M1 is configured to provide a reactive torque varying in a range covering the high output region of the engine during the vehicle running in a high output region, the first electric motor M1 becomes large in size. To minimize the first electric motor M1, the determination torque T1 is set to depend on the characteristic of the first electric motor M1 such that, for instance, the maximum output of electric energy being generated by the first electric motor M1 is lowered.

Figure 7:
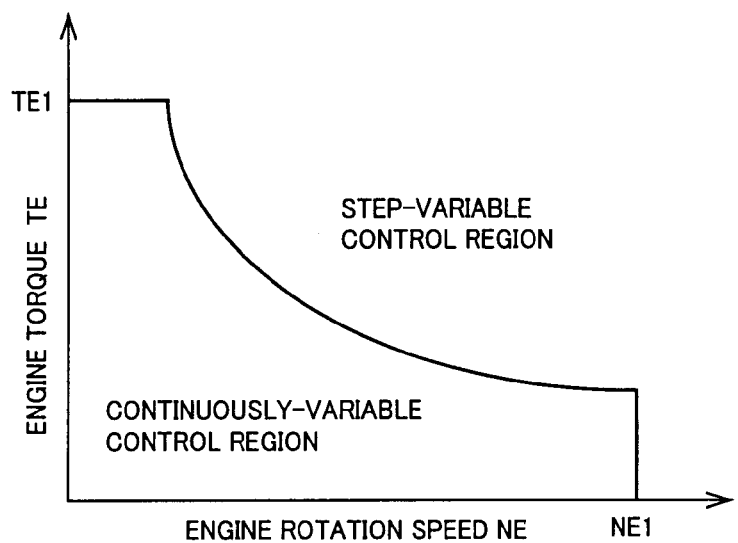
FIG. 7 is a view showing a relationship including a boundary line between a continuously variable control area and a step-variable control area and stored in advance, being a conceptual diagram for mapping the boundary between the continuously variable control area and the step-variable control area that is indicated by broken lines in FIG. 6.

FIG. 7 represents a switching diagram (switching map and relation), preliminarily stored in the memory means 56. It has an engine output line in the form of a boundary line to allow the switching control means 50 to execute the regional determination on which of the step-variable control area and the continuously variable control area is to be selected in terms of the parameters including the engine speed $N_E$ and the engine torque $T_E$. The switching control means 50 may execute the operation based on the engine speed $N_E$ and the engine torque $T_E$ by referring to the switching diagram shown in FIG. 7 in place of referring to the switching diagram shown in FIG. 6. That is, the switching control means 50 may determine whether the vehicle condition, represented with the engine speed $N_E$ and the engine torque $T_E$, is placed in the step-variable control area or the continuously variable control area. Further, FIG. 7 is a conceptual view for the broken line to be plotted as shown in FIG. 6. In other words, the broken line in FIG. 6 also represents shifting lines rewritten on the two-dimensional coordinate in terms of the parameters including the vehicle speed V and the output torque $T_{OUT}$ based on the relational diagram (map) shown in FIG. 7.

As indicated on the relation shown in FIG. 6, the step-variable control area is set to lie in the high torque region, where the output torque $T_{OUT}$ is greater than the predetermined determination output torque T1, or the high vehicle speed region where the vehicle speed V is greater than the predetermined determination vehicle speed V1. Therefore, a step-variable shift running area is effectuated in a high drive torque region, where the engine 8 operates at a relatively high torque, or a relatively high vehicle speed region of the vehicle speed. Further, a continuously variable shift running area is effectuated in a low drive torque region, where the engine 8 operates at a relatively low torque, or a relatively low vehicle speed region of the vehicle speed, that is, during a normal output region of the engine 8.

In the relation shown in FIG. 7, similarly, the step-variable shifting control region is set to lie in a high-torque region where the engine torque $T_E$ is greater than a predetermined given value TE1, a high-speed rotating region where the engine speed $N_E$ is greater than a predetermined given value NE1, or a high-output region where the engine output, calculated based on the engine torque $T_E$ and the engine speed $N_E$, is greater than a given value. Therefore, the step-variable shift running area is effectuated at a relatively high torque, a relatively high rotating-speed or a relatively high-output of the engine 8. The continuously variable shift running area is effectuated at a relatively low torque, a relatively low rotating-speed or a relatively low-output of the engine 8, that is, in the normal output region of the engine 8. The boundary line in FIG. 7 between the step-variable control area and the continuously variable control area corresponds to a high vehicle-speed determination line which forms a series of high vehicle-speed determination values and a high-output running determination line which forms a series of high-output running determination values.

With such a boundary line, the shifting mechanism 10 is placed in the continuously variable shifting state to ensure the vehicle to have fuel economy performance during the running of the vehicle at, for instance, a low/medium speed and low/medium output. In the high speed running region where an actual vehicle speed V exceeds the determination vehicle speed V1, the shifting mechanism 10 is placed in the step-variable shifting state operative to act as a step-variable transmission. In this moment, the output of the engine 8 is transferred to the drive wheels 38 mainly through a mechanical power transmitting path. This suppresses a loss in conversion between drive power and electric energy, generated when the shifting mechanism 10 is caused to act as an electrically controlled continuously variable transmission, providing improved fuel consumption.

Further, during the running of the vehicle at the high output of the engine where the drive-force related value such as the output torque $T_{OUT}$ or the like exceeds the determination torque T1, the shifting mechanism 10 is placed in the step-variable shifting state acting as the step-variable transmission. In this moment, the output of the engine 8 is transferred to the drive wheels 38 mainly through the mechanical power transmitting path. Therefore, the electrically controlled continuously variable transmission is caused to operate in the low/medium speed running region and the low/medium output running region of the vehicle. Accordingly, this results in a reduction in the maximum value of the electric energy being generated by the first electric motor M1, that is, the electric energy being transmitted by the same. Thus, a further miniaturization can be achieved in the first electric motor M1 per se or the vehicle drive apparatus including such a component.

That is, if the predetermined value TE1 is set in advance as the switching judgment value of the engine torque $T_E$ against which the first electric motor M1 can bear the reaction torque, in the high output running where the engine torque $T_E$ exceeds the predetermined value TE1, the differential portion 11 is placed in the step-variable shifting state. In this state, the first electric motor M1 not required to bear the reaction torque against the engine torque $T_E$, is prevented from being large-sized while being suppressed in its durability lowering. In other words, the compact sizing of the first electric motor M1 of this embodiment is realized by its maximum output being made small in comparison to the reaction torque capacity that is required with respect to the maximum value of the engine torque $T_E$. That is, the maximum output of the first electric motor M1 is selected not to correspond to a reaction torque capacity for the engine torque $T_E$ exceeding the predetermined value TE1.

The maximum output of the first electric motor M1 is a rated value that is experimentally determined so as to be admissible in the usage environment of the first electric motor M1. The switching judgment value of the engine torque $T_E$ is the maximum value of the engine torque $T_E$ against which the first electric motor M1 can bear the reaction torque, or is a value less than it by a predetermined amount. It is experimentally determined in advance so that the lowering of the durability of the first electric motor M1 is suppressed.

Figure 8:
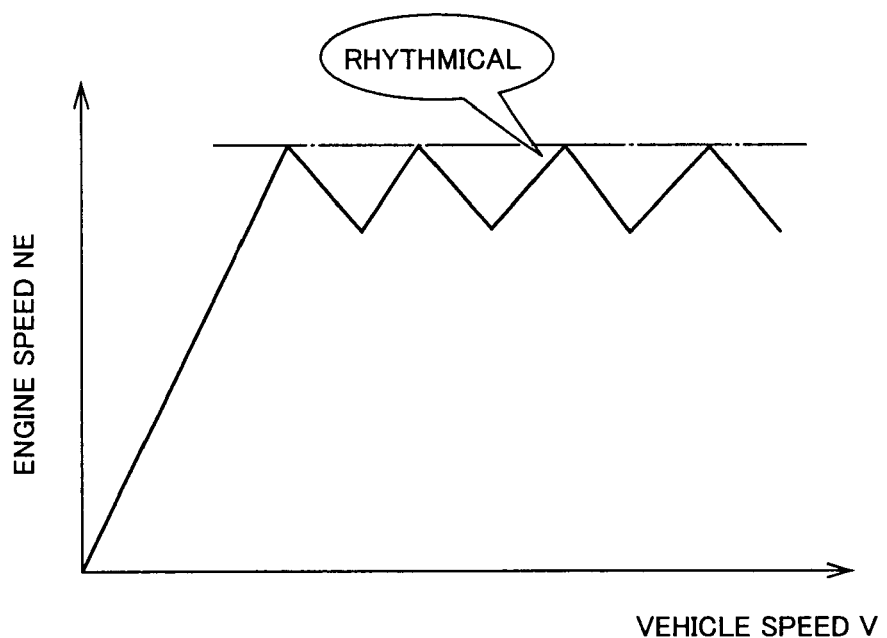
FIG. 8 shows an example of variation of an engine rotating speed that is accompanied by an up-shift in a step-variable transmission.

In other words, moreover, a driver's requirement for the drive force is more important than a requirement for fuel economy during the running region of the vehicle at the high output. Therefore, the shifting mechanism 10 is switched to the step-variable shifting state (fixed shifting state) rather than the continuously variable shifting state. This allows a driver to enjoy a change in the engine speed $N_E$ resulting from the up-shifting in the step-variable automatic shift running region as shown in, for instance, FIG. 8, that is, a rhythmical change in the rotating speed $N_E$ of the engine.

Figure 9:
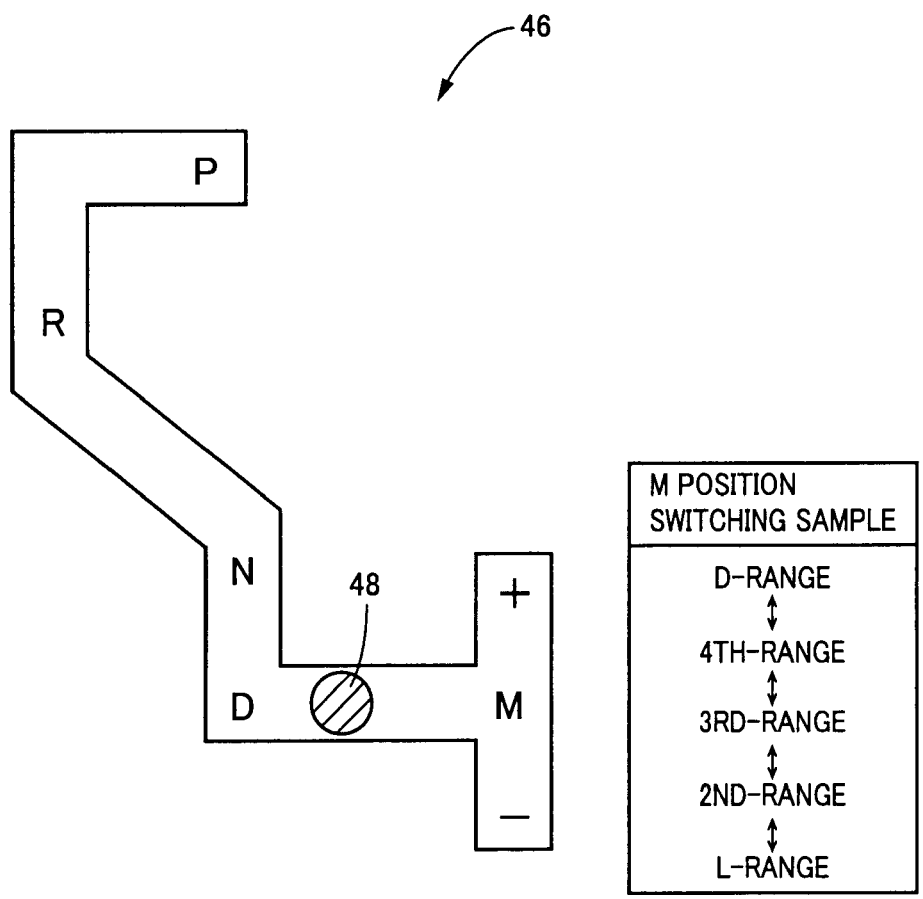
FIG. 9 shows an example of a shifting device that is operated to select one of plural kinds of the shift positions.

FIG. 9 shows on sample of a switch device 46 to be switched by manual operation to one of plural kinds of shift positions. This switch device 46 includes a shift lever 48 disposed for example at lateral side of the driver's seat and manually operated to select one of plural kinds of shifting positions. This shift lever 48 is selectively shifted to one of a parking position "P (parking)", rearward running position "R (reverse)" for rearward running, neutral position "N (neutral)", forward automatically shifted running drive position "D (drive)", and forward manually shifted running drive position "M (manual)". In the "P (parking)", none of the engaging device such as the first clutch C1 and the second clutch C2 are not engaged to set the interrupt state of the power transmitting path in the shifting mechanism 10 i.e., the automatic transmission 20, and to lock rotation of the output shaft 22. In the "N (neutral)", the power transmitting path in the shifting mechanism 10 is interrupted.

For example, in conjunction with manual operations of the shift lever 48 to the respective shift positions, manual valves in the hydraulically operated control circuit 42 mechanically connected to the shift lever 48, are switched. The hydraulically operated control circuit 42 is thereby mechanically switched so that the reverse-gear position "R," the neutral position "N," or the forward-gear position "D," etc., shown in the engagement operation table of FIG. 2, is established. The respective gear positions from the first to fifth gear positions in the "D" or "M" position, shown in the engagement operation table of FIG. 2, are established by electrical switching of the solenoid-operated valves in the hydraulically operated control circuit 42.

Among the respective shifting positions "P" to "M," at each of the non-running positions such as "P" and "N," for example, both the first clutch C1 and the second clutch C2 are released as shown in the engagement operation table of FIG. 2. These are non-drive positions for selecting a state in which the power transmitting path in the automatic transmission 20 is cut off to disable the vehicle drive. That is, this is a non-drive state in which the path of power transmission is cut off or interrupted by the first clutch C1 and the second clutch C2.

Also, at each of the running positions "R" "D" and "M" for example, at least one of the first clutch C1 and the second clutch C2 is engaged as shown in the engagement operation table of FIG. 2. These are drive positions for selecting a state in which the power transmitting path in the automatic transmission 20 is connected to enable the vehicle drive. That is, these are the drive position for selecting a transmitting state of the power transmitting path by both or one of the first clutch C1 and the second clutch C2.

Specifically, the second clutch C2 is engaged by manual operation of the shift lever 48 from the "P" position or the "N" position to the "R" position, so that the power transmitting path in the automatic transmission 20 is switched from a power transmission cutoff state to a power transmissible state. At least the first clutch C1 is engaged by manual operation of the shift lever 48 from the "N" position to the "D" position, so that the power transmitting path in the automatic transmission 20 is switched from a power transmission cutoff state to a power transmissible state. Also, the "D" position is the running position at the maximum speed, and the "4" range to "L" range in the "M" position are engine brake ranges for obtaining an engine brake effect.

The "M" position is located at the same position as the "D" position in the longitudinal direction of the vehicle, and is adjacent thereto in the lateral direction of the same. The shift lever 48 is operated to the "M" position, for manually selecting one of the above-indicated "D" through "L" positions. Described in detail, at the "M" position, a shift-up position "+" and a shift-down position "−" spaced from each other in the longitudinal direction of the vehicle are disposed. Each movement of the shift lever 48 to the shift-up position "+" or the shift-down position "−", any one of "D" to "L" positions is selected.

The "D" through "L" positions selected at the "M" position have respective different lowest values of the overall speed ratio γT which corresponds to the highest output speed of the shifting mechanism 10. Namely, the five "D" through "L" positions select respective different numbers of the speed positions (gear positions) of the automatic transmission 20 automatically selectable, so that the highest vehicle speed available is determined by the selected number of the gear positions. The shift lever 48 is biased by biasing means such as a spring to be automatically returned from the shift-up position "+" and shift-down position "−" back to the manual forward-drive position M. The shift device 46 is provided with a shift-position sensor (not shown) operable to detect the presently selected position of the shift lever 48, so that signals indicative of the presently selected operating position of the shift lever 48 and the number of shifting operations thereof in the "M" position, are outputted to the electronic control device 40.

When the shift lever 48 is operated to the "D" position, the switching control means 50 effects an automatic switching control of the shifting mechanism 10 according to the stored switching boundary line map indicated in FIG. 6, the hybrid control means 52 effects the continuously-variable shifting control of the power distributing mechanism 16, and the step-variable shifting control means 54 effects an automatic shifting control of the automatic transmission 20.

When the shifting mechanism 10 is placed in the step-variable shifting state, for example, the shifting action thereof is automatically controlled to select an appropriate one of the first through the fifth gear position indicated in FIG. 2. When the shifting mechanism 10 is placed in the continuously-variable shifting state, the speed ratio of the power distributing mechanism 16 is continuously changed, while the shifting action of the automatic transmission 20 is automatically controlled to select an appropriate one of the first through fourth gear positions, so that the overall speed ratio γT of the shifting mechanism 10 is controlled so as to be continuously variable within the predetermined range. The "D" position is a position selected to establish an automatic shifting mode (automatic mode) in which the shifting mechanism 10 is automatically shifted.

When the shift lever 48 is operated to the "M" position, the shifting action of the shifting mechanism 10 is automatically controlled by the switching control means 50, hybrid control means 52 and step-variable shifting control means 54, such that the overall speed ratio γT is variable within a predetermined range the lower limit of which is determined by the gear position having the lowest speed ratio, which gear position is determined by the manually selected one of the shift positions. When the shifting mechanism 10 is placed in the step-variable shifting state, for example, the shifting action thereof automatically controlled within the above-indicated predetermined range of the overall speed ratio γT.

When the shifting mechanism 10 is placed in the step-variable shifting state, the speed ratio of the power distributing mechanism 16 is continuously changed, while the shifting action of the automatic transmission 20 is automatically controlled to select an appropriate one of the gear positions the number of which is determined by the manually selected one of the shift positions, so that the overall speed ratio γT of the shifting mechanism 10 is controlled to be continuously variable within the predetermined range. The "M" position is a position selected to establish a manual shifting running mode (manual mode) in which the selectable gear positions of the shifting mechanism 10 are manually selected.

Returning now to FIG. 5, a shift-position judge means 80 judges, on the basis of a signal from a shift position sensor 49 expressing the shifting position $P_{SH}$ of the shift lever 48, which position the shift lever 48 is at currently or to which position the shift lever 48 has been operated to. For example, the shift-position judge means 80 judges whether the shifting position $P_{SH}$ of the shift lever 48 is at the "D" position or the "R" position, both of which are drive positions.

A drive source judge means 82 judges which of the engine 8 and the second electric motor M2 is mainly used by the hybrid control means 52 as the drive power source for vehicle running. For example, the drive source judge means 82 judges whether or not the engine 8 is mainly used as the drive power source for running by judging whether or not the vehicle is currently in the engine running area. The judgment is based on the actual vehicle state indicated, for example, by the vehicle speed V and the output torque $T_{OUT}$ in the drive source switching diagram shown in FIG. 6.

The differential portion 11 of this embodiment is selectively switchable between the continuously variable shifting state and the step-variable shifting state (fixed shifting state). In the continuously variable shifting state, the hybrid control means 52 causes the first electric motor M1 to generate the reaction torque against the input torque $T_{INS}$ inputted into the differential portion 11 for example the engine torque $T_E$. Thus, the continuously variable shifting state of the differential portion 11 is controlled appropriately. In the step-variable shifting state of the differential portion 11, since the first electric motor M1 need not generate the reaction torque, the hybrid control means 52 makes the reaction torque not correspond to an engine torque $T_E$ that exceeds for example the predetermined TE1. The first electric motor M1 is thereby made small in maximum output and compact in size.

For the differential portion 11 to be placed in the step-variable shifting state, the switching clutch C0 or the switching brake B0 must be engaged by the switching control means 50. However, malfunction (failure) of the switching clutch C0 or the switching brake B0, malfunction of a solenoid-operated valve in the hydraulically operated control circuit 42, or a response lag or delay due to functional degradation of any of such components, etc., may occur. In this case, even if the engine torque $T_E$ actually exceeds the predetermined value TE1, the switching clutch C0 or the braking clutch B0 does not engage, which does not switch the differential portion 11 to the step-variable shifting state.

In this embodiment, for purpose of small-sizing, the first electric motor M1 is constructed so that its maximum output does not correspond to the reaction torque against the engine torque $T_E$ that exceeds the predetermined value TE1. Consequently, there is a fear that the durability of the first electric motor M1 may be lowered in comparison to a case where the differential portion 11 is switched to the step-variable shifting state appropriately. However, constructing the first electric motor M1 large-sized so as to accommodate the reaction torque against the engine torque $T_E$ that exceeds the predetermined value TE1 in preparation for malfunction of the switching clutch C0 or the switching brake B0, is deviated from the object (gist) of the present invention for making the first electric motor compact.

For preventing the large-sizing and for suppressing the durability lowering of the first electric motor M1, the engine torque $T_E$ is controlled, during engine starting/running, so as not to exceed the predetermined value TE1. For this purpose, the shift-position judge means 80, the drive source judge means 82, a step-variable switching propriety judge means 84, an input torque limit means 86, etc., are provided. The control operations of these shall now be described.

The step-variable-switching propriety judge means 84 judges whether or not the differential portion 11 is switched from the continuously variable shifting state (differential state) to the step-variable shifting state (locked state) by the switching control means 50. Here, the judgment is made depending on whether or not the switching clutch C0 or the switching brake B0 can be engaged by the hydraulically operated control circuit 42, for example, in accordance with an instruction or command from the switching control means 50. Specifically, engagement propriety (ability/inability) of the switching clutch C0 or the switching brake B0 is judged based on failure of a friction material or a hydraulic actuator of the switching clutch C0 or the switching brake B0, failure of a solenoid-operated valve included in the hydraulically operated control circuit 42 for controlling the hydraulic actuator, or a response delay due to functional degradation of the hydraulic actuator, solenoid-operated valve, etc., or low oil temperature, etc.

The input torque limit means 86 limits the input torque $T_{INS}$ inputted from the engine 8 into the differential portion 11 to the value not more than, i.e., equal to or smaller than a predetermined torque TS1, when the differential portion 11 cannot be switched from the continuously variable shifting state to the step-variable shifting state. Specifically, upon judgment of the "D" or "W" position by the shift-position judge means 80, judgment of the engine running area is judged by the drive source judge means 82, and the switching inability judgment of the differential portion 11 from the continuously variable shifting state (differential state) to the step-variable shifting state (locked state) by the step-variable-switching propriety judge means 84, the input torque limit means 86 limits the input torque $T_{INS}$ inputted into the differential portion 11 to the value not more than the predetermined torque TS1. The limiting of the input torque is based on the reaction torque generable by the first electric motor M1 against the input torque $T_{INS}$ inputted into the differential portion 11.

For example, in this embodiment, because the maximum output of the first electric motor M1 is set smaller than the reaction torque capacity required therefore against the maximum value of the engine torque $T_E$. The predetermined torque TS1 is set in advance as a limit value of the input torque $T_{INS}$ inputted into the differential portion 11 against which the first electric motor M1 can bear the reaction torque. The limit value of the input torque $T_{INS}$ is the maximum value thereof against which the first electric motor M1 can bear the reaction torque, or a value smaller than this maximum value by a predetermined amount. It is experimentally determined in advance to be as large as possible so that not only the durability lowering of the first electric motor M1 is suppressed but the lowering of the power performance is suppressed. The first electric motor M1, bearing the reaction torque against the input torque $T_{INS}$ inputted into the differential portion 11, is prevented from being made large-sized, and suppressed in its durability lowering.

For example, the input torque limit means 86 outputs to the hybrid control means 52, an instruction of command to limit the engine torque $T_E$ to not more than the predetermined torque TS1 for example to the value not more than the predetermined value TE1, based on the reaction torque generable by the first electric motor M1 against the engine torque $T_E$ inputted into the differential portion 11 as the input torque $T_{INS}$.

In addition to the above-described functions, the hybrid control means 52 outputs, in accordance with the command from the input torque limit means 86, an instruction or command to the engine output control device 43 to limit the engine torque $T_E$ to the value not to exceed the predetermined value TE1. As this instruction, an instruction, for narrowing the open degree of the electronic throttle valve 96, for decreasing the amount of fuel supplied by the fuel injector 98, or delaying the timing of ignition of the engine 8 by the ignition device 99, is outputted solitarily or in combination, regardless of the depression of the accelerator pedal.

Figure 10:
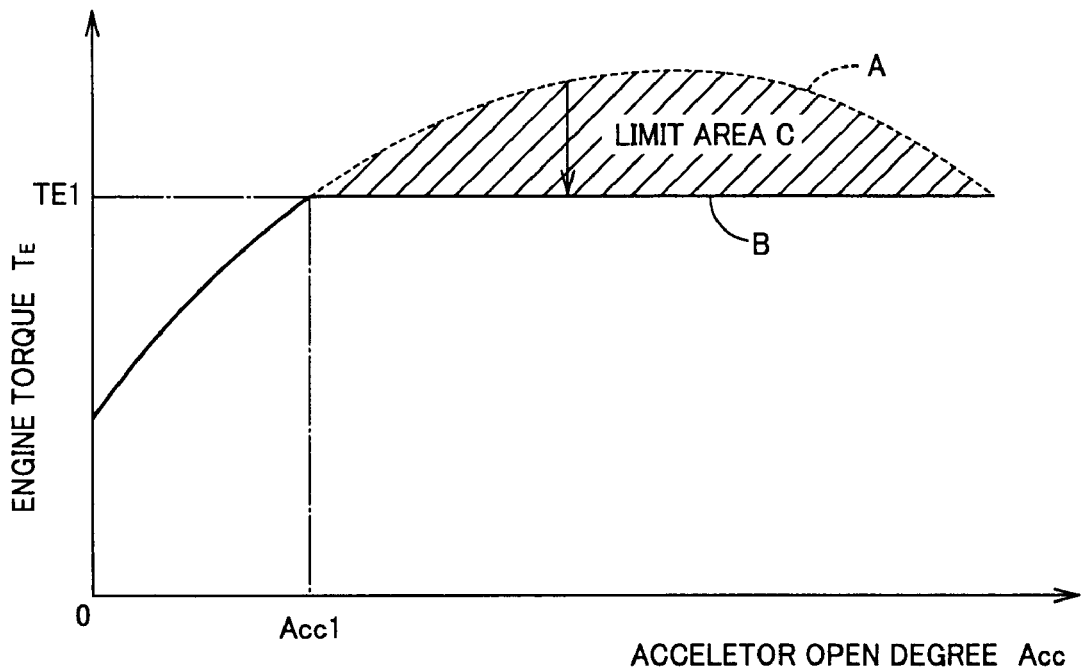
FIG. 10 shows an example of an output characteristics diagram of an engine torque relative to an accelerator pedal operation amount, with the slanted line indicating a limit area where the engine torque is limited so as not to exceed a predetermined value, with a first electric motor being prevented from being made large-sized, and suppressed in its durability lowering.

FIG. 10 shows an example of an output characteristics diagram of the engine torque $T_E$ relative to the accelerator pedal operation amount (acceleration open degree) Acc. The slanted lines of FIG. 10 indicate a high torque area where the accelerator pedal is depressed to not less than an acceleration open degree Acc1 whereby the demanded engine torque $T_E$ exceeds the predetermined value TE1. This is a limit area C where the engine torque $T_E$ is limited so as not to exceed the predetermined value TE1 so that the first electric motor M1 is prevented from being large-sized and suppressed in its durability lowering.

In this way, when the accelerator pedal is depressed beyond the acceleration open degree Acc1 with the switching of the differential portion 11 from the continuously variable shifting state to the step-variable shifting state being disabled, the input torque limit means 86 limits the engine torque $T_E$ so that the output characteristic thereof change from the broken line A to the solid line B. With this, the vehicle state is prevented from setting the locked area (step-variable control area) where the differential portion 11 must primarily be put in the step-variable shifting state.

However, not whole the high engine torque area where the engine torque $T_E$ exceeds the predetermined value TE1, is the locked area where the differential portion 11 must primarily be placed in the step-variable shifting state. That is, even in this high engine torque area, there exists an area where the differential portion 11 must be placed in the continuously-variable shifting state. This area is a limit area A where the engine torque $T_E$ is limited from a standpoint other than the inability to switch the differential portion 11 to the continuously variable shifting state. The control operation for this limit area shall now be described.

In the continuously variable shifting state of the differential portion 11, the engine rotating speed $N_E$ can be controlled without being constrained by the vehicle speed V by the electrically controlled continuously variable shifting operation. For example, the hybrid control means 52 can maintain the operation state of the engine 8 by the electrically controlled CVT function of the differential portion 11 even when the vehicle is in a stopped state or a low speed state. Thus, for example, even if a clutch, torque converter or other fluid-transmission mechanism (device) allowing the relative rotation between the input side and the output side, is not provided in the power transmitting path, the hybrid control means 52 can maintain the engine operation and satisfactorily perform engine starting, in the continuously variable shifting state of the differential portion 11.

On the other hand, in the step-variable shifting state of the differential portion 11, the power transmitting path between the engine 8 and the drive wheels 38 is mechanically connected whereby the engine rotating speed $N_E$ is constrained by the vehicle speed V. Thus, in the stopped state or an extremely low speed state of the vehicle, the hybrid control means 52 may not maintain the engine operation or perform engine starting.

For the continuously variable shifting state of the differential portion 11 to be controlled appropriately by the hybrid control means 52, the first electric motor M1 must generate the reaction torque against the engine torque $T_E$. In this embodiment, with the engine torque $T_E$ not less than the predetermined value TE1, the first electric motor M1 does not bear the reaction torque not less than the predetermined value TE1 to realize the small-sizing thereof. The differential portion 11 is placed in the step-variable shifting state. For example, when the vehicle is set in which the output torque $T_{OUT}$ demanded for engine starting reaches the high torque area of no less than the judgment output torque T1, the switching control means 50 switches the differential portion 11 to the step-variable shifting state, so that the hybrid control means 52 may not perform the engine starting. This high torque area corresponds, for example, to a case where the accelerator pedal is depressed by such a large amount that the demanded engine torque $T_E$ reaches the high torque area of not less than the predetermined value TE1.

From another viewpoint, for the above-described engine starting caused by large or deep depression of the accelerator pedal, either the differential portion 11 must be maintained in the continuously variable shifting state without consideration of the durability lowering of the first electric motor M1, or the first electric motor M1 must be made large enough to generate the reaction torque against an engine torque $T_E$ beyond the predetermined value TE1 only to accommodate for the starting.

So that the first electric motor M1 is prevented from being made large-sized and suppressed in its durability lowering, while enabling engine starting to be executed appropriately by the hybrid control means 52, the following operation is performed. That is, in addition to having the above-described functions, the input torque limit means 86 outputs a command to the hybrid control means 52, even if the step-variable switching propriety judge means 84 judges that engagement ability or possibility of the switching clutch C0 or the switching brake B0, upon engine starting in which the vehicle is put in the stopped state or the extremely low speed state. By this command, the engine torque $T_E$ is limited to the value not more than the predetermined torque TS1, for example not more than the predetermined value TE1, based on the reaction torque that the first electric motor M1 can generate against the engine torque $T_E$ inputted into the differential portion 1 as the input torque $T_{INS}$.

That is, the differential portion 11 is switched to the step-variable shifting state when the demanded engine torque $T_E$ reaches or belongs to the high torque limited area of not less than the predetermined value TE1. Thus, even if the step-variable switching propriety judge means 84 judges engagement ability of the switching clutch C0 or the switching brake B0, the input torque limit means 86 controls the engine torque $T_E$ so as not to exceed the predetermined value TE1 upon engine starting. This allows the differential portion 11 maintained in the continuously variable shifting state by the switching control means 50, to operate as an electrically controlled continuously variable transmission via the hybrid control means 52.

In addition to having the above-described functions, the step-variable switching propriety judge means 84 judges, the switching of the differential portion 11 from the continuously variable shifting state (differential state) to the step-variable shifting state (locked state) by the switching control means 50. This judgment is based on whether or not the vehicle is in the stopped state or the extremely low vehicle speed state, For example, even when engagement ability of the switching clutch C0 or the switching brake B0 is judged, if the actual vehicle speed V is not more than a predetermined vehicle speed V2, the step-variable switching propriety judge means 84 judges switching inability or impossibility of the differential portion 11 from the continuously variable shifting state (differential state) to the step-variable shifting state (locked state). This predetermined vehicle speed V2 corresponds to a rotation speed at which the autonomous rotation of the engine 8 can be maintained, that is for example, to an idle rotation speed $N_{IDL}$. It is a judgment vehicle speed determined and stored in advance to judge the engine rotation speed $N_E$ constrained by the vehicle speed V in the step-variable shifting state of the differential portion 11.

The limit area C, indicated by the slanted lines in FIG. 10, is also a limit area where the engine torque $T_E$, demanded by the accelerator pedal depressed beyond the acceleration open degree Acc1, is limited so as not to exceed the predetermined value TE1 for maintaining the differential portion 11 in the continuously-variable shifting state. When the step-variable switching propriety judge means 84 judges the actual vehicle speed V to be not more than the predetermined vehicle speed V2, if the accelerator pedal is depressed beyond the acceleration open degree Acc1, the input torque limit means 86 limits the engine torque $T_E$ so that the output characteristics thereof changes from the broken line A to the solid line B. The differential portion 11 is thus made to operate as the electrically controlled continuously variable transmission by the hybrid control means 52.

Figure 11:
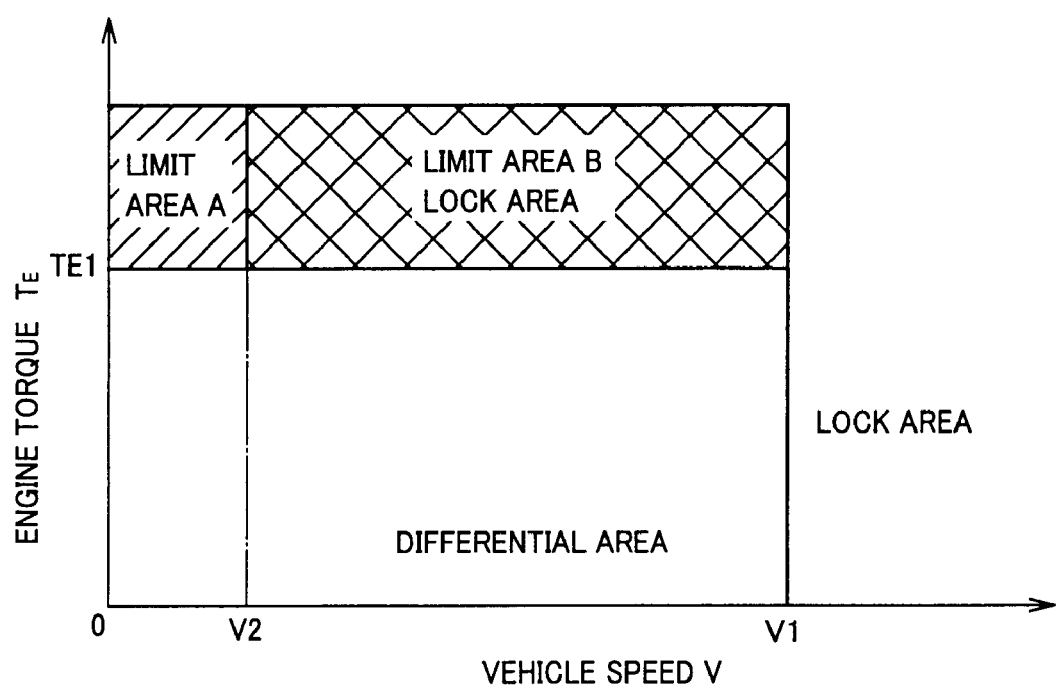
FIG. 11 shows an example, in which the continuously variable control area (differential action area) and the step-variable control area (locked area) of FIG. 6 and FIG. 7 are redrawn in a two-dimensional coordinate system having vehicle speed and engine torque as parameters, with the slanted line indicating a limit area the engine torque is limited so as not to exceed a predetermined value in a case of a differential portion being unable to be switched from a continuously variable shifting state to a step-variable shifting state.

FIG. 11 shows an example in which the continuously variable shifting area (differential area) and the step-variable shifting area (locked area) shown in FIGS. 6 and 7 are redrawn on a two-dimensional coordinate system having the vehicle speed V and the engine torque $T_E$ as parameters. In the high torque area indicated by the slanted lines in FIG. 11, the vehicle speed V is not more than the predetermined vehicle speed V2 and the demanded engine torque $T_E$ exceeds the predetermined value TE1. Because the differential portion 11 is maintained in the continuously variable shifting state, the engine torque $T_E$ should be limited so as not to exceed the predetermined value TE1. That is, in this limit area A, for appropriate execution of engine starting, the differential portion 11 cannot be switched to the step-variable shifting state (locked state) by the switching control means 50, so that the engine torque $T_E$ is limited below the predetermined value TE1.

Also in the high torque area indicated by the mesh portion in FIG. 11, the vehicle speed V exceeds the predetermined vehicle speed V2 and the demanded engine torque $T_E$ exceeds the predetermined value TE1. To avoid the locked area caused by engagement inability of the switching clutch C0 or the switching brake B0, the engine torque $T_E$ should be limited so as not to exceed the predetermined value TE1. That is, although this limited area B is the locked limited area where the differential portion 11 is primarily placed in the step-variable shifting state, because of the engagement inability of the switching clutch C0 or the switching brake B0, the differential portion 11 cannot be switched to the step-variable shifting state (locked state) by the switching control means 50. The engine torque $T_E$ should thus be limited to the value so as not to exceed the predetermined value TE1.

In this way, when the starting of the vehicle having the engine 8 as the drive power source, when the vehicle speed V is not more than the predetermined vehicle speed V2, or when the engagement of the switching clutch C0 or the switching brake B0 is unable, the engine torque $T_E$ is limited by the input torque limit means 86 so as to be not more than the limit area A or B.

When the shifting position $P_{SH}$ of the shift lever 48 is the non-drive position of "P" or "N," both the first clutch C1 and the second clutch C2 are released so that the power transmitting path between the differential portion 11 and the automatic transmission 20 is cutoff. In this state, because the first electric motor M1 is not required to generate the reaction torque against the engine torque $T_E$, the limiting of the engine torque $T_E$ by the input torque limit means 86 is not required.

Also, when the shifting position $P_{SH}$ of the shift lever 48 is "N", the differential portion 11 is placed in the neutral state by the hybrid control means 52, the first electric motor M1 put in the no-load state does not generate the reaction torque against the engine torque $T_E$. The limiting of the engine torque $T_E$ by the input torque limit means 86 is not required.

Figure 12:
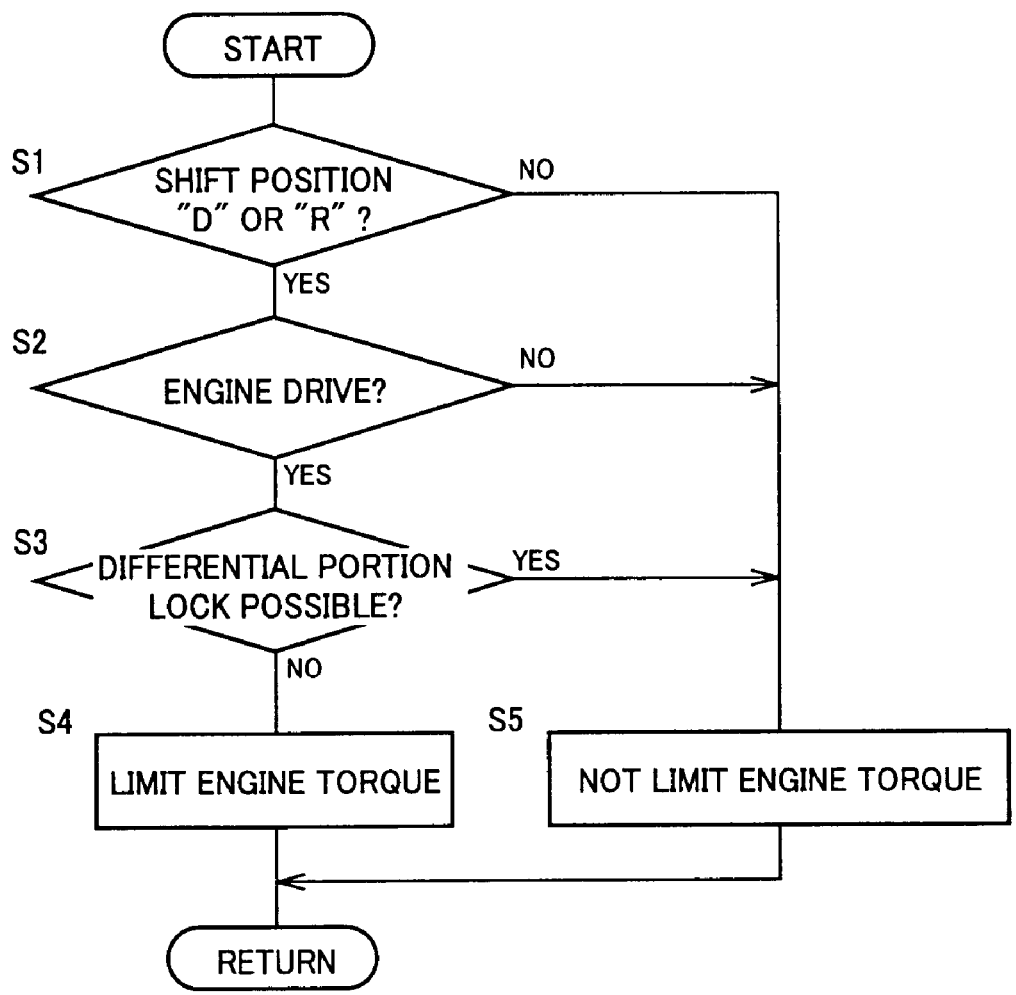
FIG. 12 is a flowchart for describing a control operation executed by the electronic control device of FIG. 5, that is, an engine torque limit control operation executed when the differential portion is unable to be switched from the continuously variable shifting state to the step-variable shifting state.
Figure 13:
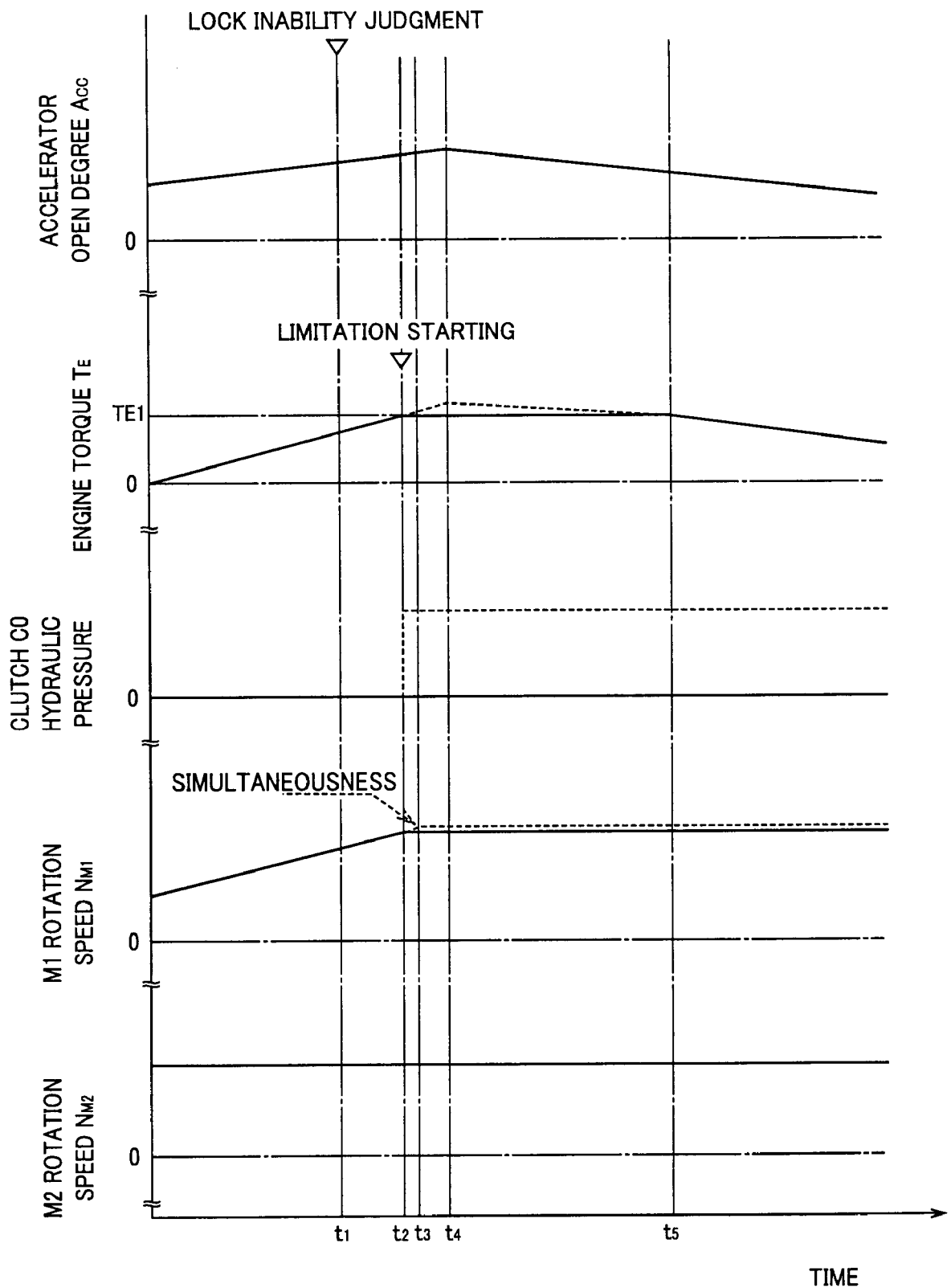
FIG. 13 shows an example of a control operation carried out in accordance with the flowchart of FIG. 12, being a time chart for describing the control operation for a case where, regardless of depression of an accelerator pedal by a driver during running of the vehicle with the differential portion in the continuously variable shifting state, the differential portion is unable to be switched to the locked state due to failure of a switching clutch, etc., and engine torque limiting is executed.

FIG. 12 is a flowchart describing a principal portion of a control operation executed by the electronic control device 40, that is an engine torque limit control operation executed when the differential portion 11 cannot be switched from the continuously variable shifting state (differential state) to the step-variable shifting state (locked state). This operation is executed repeatedly at an extremely short cycle time, for example, of several msec to several tens msec. FIG. 13 is a time chart of a control operation carried out in accordance with the flowchart of FIG. 12. This figure describes the control operation of executing the engine torque limiting due to switching inability of the differential portion 11 to the locked state caused by failure of the switching clutch C0, etc., despite depression of the accelerator pedal by the driver during vehicle running with the differential portion 11 (power distributing mechanism 16) being in the continuously variable shifting state (differential state, non-locked state).

First, in a step S1 corresponding to the shift-position judge means 80, whether or not the shifting position is the drive position "D" or "R" is judged, based on the signal from the shift position sensor 49 that expresses the shifting position $P_{SH}$ of the shift lever 48.

If a positive judgment is made at the step S1, then in a step S2 corresponding to the drive source judge means 82, it is judged whether or not the hybrid control means 52 performs control to use the engine 8 as the drive power source for running. In this process, the drive source judge means 82 judges whether or not the vehicle is currently in the engine running area, based on the actual vehicle state indicated, for example by the vehicle speed V and the output torque $T_{OUT}$ in the drive source switching diagram shown in FIG. 6.

If a positive judgment is made at the step S2, then in a step S3 corresponding to the step-variable switching propriety judge means 84, it is judged whether or not the differential portion 11 can be switched from the continuously variable shifting state (differential state) to the step-variable shifting state (locked state) by the switching control means 50. For example, the step-variable switching propriety judge means 84 judges engagement propriety of the switching clutch C0 or the switching brake B0, based on failure of a friction material or a hydraulic actuator of the switching clutch C0 or the switching brake B0. At a time point $t_1$ in FIG. 13, it is judged, during vehicle running with the differential portion 11 being in the continuously variable shifting state, the engagement inability of the switching clutch C0 due to failure of the switching clutch C0 (switching brake B0), etc.

If a negative judgment is made at the step S3, when the input torque $T_{INS}$ inputted into the differential portion 11 exceeds the predetermined torque TS1, the first electric motor M1 cannot bear the reaction torque against this input torque $T_{INS}$. Thus in a step S4 corresponding to the input torque limit means 86, the input torque limit means 86 outputs to the hybrid control means 52, the command to limit the input torque $T_{INS}$ inputted into the differential portion 11 for example the engine torque $T_E$ to the value not more than the predetermined value TE1, on the basis of the reaction torque generable by the first electric motor M1.

In accordance with this command, the hybrid control means 52 outputs for example to the engine output control device 43, regardless of acceleration pedal depression, the command to narrow the opening of the electronic throttle valve 96, the command to decrease the amount of fuel supplied by the fuel injector 98, or the command to delay the ignition timing of the engine 8 by the ignition device 99 solitarily or in combination thereof. The vehicle state is thereby prevented from falling within the limit area B in FIG. 11.

At a time point $t_2$ in FIG. 13, because of the engagement inability of the switching clutch C0, engine torque limiting is started to prevent the engine torque $T_E$ from exceeding the predetermined value TE1.

If a negative judgment is made at the step S1 or the step S2, or a positive judgment is made at the step S3, in a step S5 corresponding to the input torque limit means 86, limiting control of the engine torque $T_E$ is not executed. Limiting of the engine torque $T_E$ is unnecessary, for example, not only in cases where the differential portion 11 can be switched to the step-variable shifting state (locked state), but in cases where the engine torque $T_E$ does not exceed the predetermined value TE1 or the differential portion 11 is placed in the neutral state, etc.

From the time point $t_2$ to a time point $t_5$ on the solid line in FIG. 13, the torque is limited so that the engine torque $T_E$ does not exceed the predetermined value TE1. That is, even if an engine torque $T_E$ such as that indicated by the broken line is demanded by the depression of the accelerator pedal, torque limiting is performed so that the actual engine torque $T_E$ does not exceed the predetermined value TE1. Also, after the time point $t_5$ on the solid line in FIG. 13, the driver returns the accelerator pedal (after a time point t4), whereby the torque limiting of the engine torque $T_E$ becomes unnecessary. Thus, the engine torque limiting started at the time point $t_2$ is ended.

Also as indicated by the broken line in FIG. 13, under engagement ability of the switching clutch C0, in place of the engine torque limiting started at the time point $t_2$, the switching clutch C0 is engaged to switch the differential portion 11 to the step-variable shifting state at the time point $t_2$. In this case, the engine torque $T_E$ is controlled so as to satisfy the demanded engine torque $T_E$ indicated by the broken line from the time point $t_2$ to the time point $t_5$. Also from the time point $t_2$ to the time point $t_3$ on the broken line, the first electric motor M1 may be used to perform synchronous control such that the rotation speed of the first sun gear S1 coincides with the rotation speed after completion of engagement of the switching clutch C0, in order to suppress the engagement shock in the process of engagement of the switching clutch C0.

As described above, with this embodiment, when the differential portion 11 cannot be switched from the continuously variable shifting state to the step-variable shifting state, the input torque limit means 86 limits the input torque $T_{INS}$ input from the engine 8 into the differential portion 11, to the value not more than the predetermined torque TS1. Thus, in comparison with the case where the input torque $T_{INS}$ is not limited, the output of the first electric motor M1 that bears the reaction torque against the input torque $T_{INS}$ can be made small-sized. That is, even when switching of the differential portion 11 from the continuously variable shifting state to the step-variable shifting state cannot be performed, the maximum value of the output to be generated by the first electric motor M1 needs not be increased to accommodate for the case of the non-limited input torque $T_{INS}$. The first electric motor M1 is thus prevented from being made large-sized, and is suppressed from the lowered durability by the limiting of the input torque $T_{INS}$ against which the first electric motor M1 should bears the reaction torque.

Also, with this embodiment, the input torque $T_{INS}$ inputted from the engine 8 into the differential portion 11 is limited to the value not more than the predetermined torque TS1 by the engine torque $T_E$ being limited to not more than the predetermined value TE1 by the input torque limit means 86. Thus, in comparison to the case of the non-limited engine torque $T_E$, the output of the first electric motor M1 that bears the reaction torque against the engine torque $T_E$ can be made small-sized.

Also, with this embodiment, on the basis of the reaction torque generable by the first electric motor M1 against the input torque $T_{INS}$ inputted into the differential portion 11, the input torque limiting means 86 limits the input torque $T_{INS}$ to the value not more than the predetermined torque TS1. The output of the first electric motor M1 can bear the reaction torque against the input torque $T_{INS}$ inputted into the differential portion 11, and can be suppressed in the durability lowering. Also, as the input torque $T_{INS}$ inputted into the differential portion 11, the torque up to the predetermined torque TS1, that is a maximum value against which the first electric motor M1 can bear the reaction torque can be secured, and the lowering of the demanded power performance is thus suppressed.

Hereinbelow, other embodiment of the present invention will be explained. The same reference numerals are added for the members common to the Embodiment 1, and detail explanation there of will be omitted for simplicity.

Embodiment 2

Figures 14, 15:
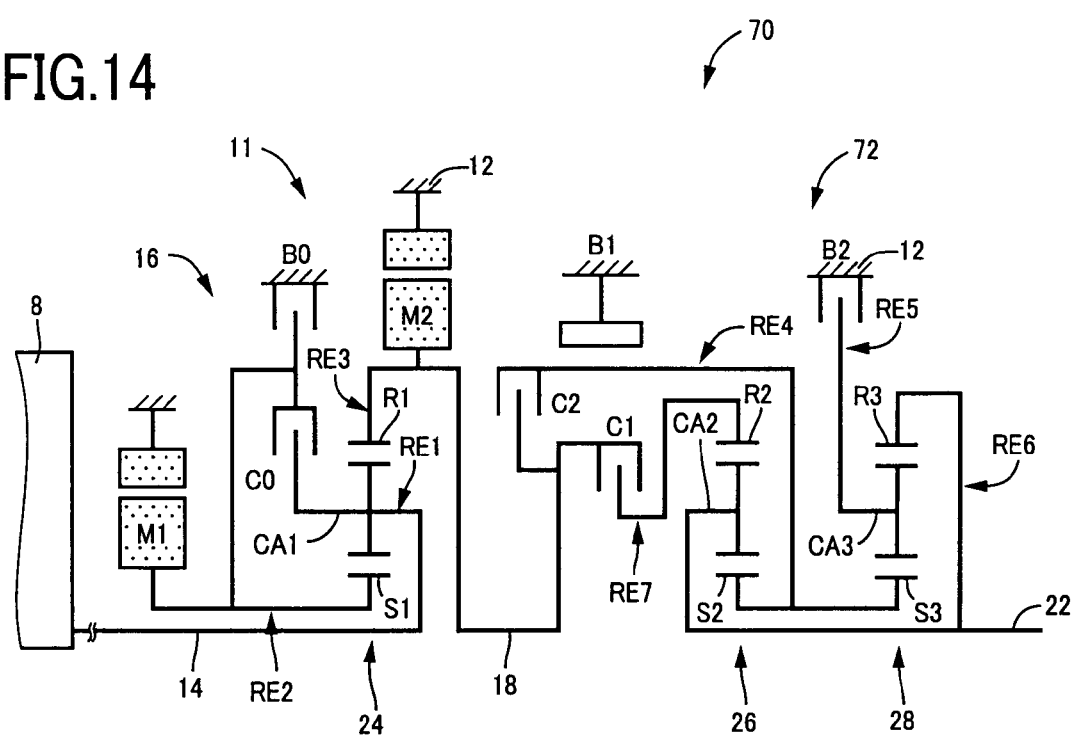
FIG. 14 is a skeleton view explaining a drive apparatus of a hybrid vehicle according to other embodiment of the present invention, corresponding to FIG. 1.
FIG. 15 is an operation Table indicating a relation between a shifting operation of the drive apparatus of the hybrid vehicle of the embodiment shown in FIG. 14 operable in a continuously variable shifting state or a step-variable shifting state, and operation combinations of hydraulic-type frictionally coupling devices used therefore, corresponding to FIG. 2.
Figure 16:
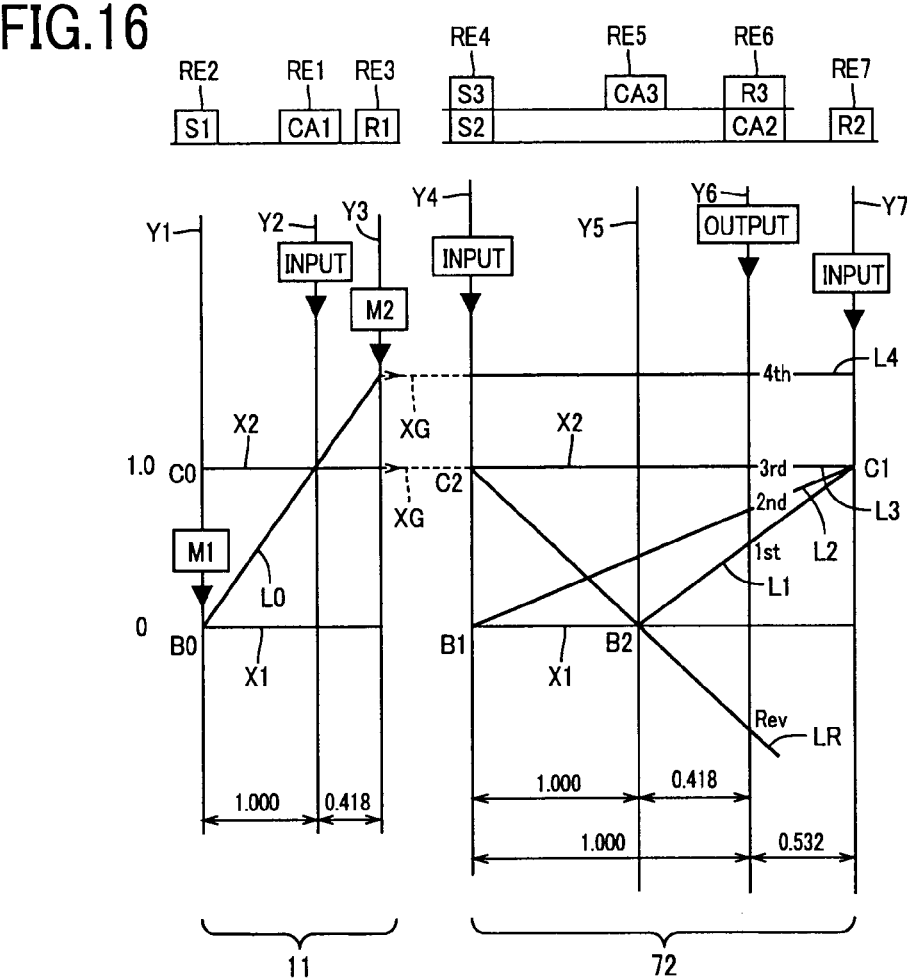
FIG. 16 is a collinear chart showing relative rotating speeds of rotating elements in each of different gear positions when the drive apparatus of the hybrid vehicle of the embodiment shown in FIG. 14 is operated in the step-variable shifting state, corresponding to FIG. 3.

FIG. 14 is a skeleton view explaining structure of a shifting mechanism 70 according to other embodiment of the present invention. FIG. 16 is an operation Table indicating a relation between a shifting position of the shifting mechanism 10, and operation combinations of hydraulic-type frictionally coupling devices used therefor. FIG. 16 is a collinear chart explaining a shifting operation of the shifting mechanism 70.

Like the illustrated embodiment described above, the shifting mechanism 70 comprises the differential portion 11 including the first electric motor M1, the power distributing mechanism 16 and the second electric motor M2, and an automatic transmission 72 i.e., automatic transmission part with three forward-gear positions connected to the differential portion 11 and the output shaft 22 in series via the transmitting member 18. The power distributing mechanism 16 includes the first planetary gear unit 24 of the single pinion type having a given speed ratio ρ1 of, for instance, about 0.418, the switching clutch C0 and the switching brake B0.

The automatic transmission 72 includes the second planetary gear unit 26 of the single pinion type having a given speed ratio ρ2 of, for instance, about 0.532, and the third planetary gear unit 28 of the single pinion type having a given speed ratio ρ3 of, for instance, about 0.418. The sun gear S2 of the second planetary gear unit 26 and the sun gear S3 of the third planetary gear unit 28 are integrally connected to each other. These sun gears S2 and S3 are selectively coupled to the transmitting member 18 via the second clutch C2 and also selectively coupled to the case 12 via the first brake B1. The second carrier CA2 of the second planetary gear unit 26 and the third ring gear R3 of the third planetary gear unit 28 integrally connected to each other are connected to the output shaft 22. The second ring gear R2 is selectively connected to the transmitting member 18 via the first clutch C1 and the third carrier CA3 is selectively coupled to the case 12 via the second brake B2.

With the shifting mechanism 70 thus constructed, the switching clutch C0, the first clutch C1, the second clutch C2, the switching brake B0, the first brake B1 and the second brake B2 are selectively coupled or engaged as shown by, for instance, the operation Table shown in FIG. 15. One of a 1st-gear position (1st-speed position) to a 4th-gear position (4th-speed position), a reverse-gear position (rear-drive position) or a neutral position is selectively established. In this moment, each gear position has a speed ratio γ(=input shaft speed $N_{IN}$/output shaft speed $N_{OUT}$) that substantially varies in equal ratio. In particular, with the present embodiment, the power distributing mechanism 16 incorporates the switching clutch C0 and the switching brake B0. With either the switching clutch C0 or switching brake B0 being coupled, the differential portion 11 can be structured to assume the continuously variable shifting state operative as the continuously variable transmission and, in addition thereto, the fixed shifting state operative as a transmission with a fixed speed ratio.

Accordingly, with either the switching clutch C0 or switching brake B0 brought into coupling engagement, the shifting mechanism 70 can take a structure for the step-variable shifting state operative as the step-variable transmission with the differential portion 11 placed in the fixed shifting state, and the automatic transmission 72. With both the switching clutch C0 and switching brake B0 brought into uncoupling states, the shifting mechanism 70 can take the continuously variable shifting state operative as the electrically controlled continuously variable transmission with the differential portion 11 placed in the continuously variable shifting state, and the automatic transmission 72. In other words, the shifting mechanism 70 is switched to the step-variable shifting state upon coupling either the switching clutch C0 or the switching brake B0, and switched to the continuously variable shifting state upon uncoupling both the switching clutch C0 and switching brake B0.

For the shifting mechanism 70 to function as the step-variable transmission, as shown for instance in FIG. 15, the switching clutch C0, the first clutch C1 and the third brake B3 are coupled, which establishes the 1st-gear position having the highest speed ratio γ1 of, for instance, about 2.804. With the switching clutch C0, the first clutch C1 and the first brake B being coupled, a 2nd-gear position is established with a speed ratio γ2 of, for instance, about 1.531 that is lower than that of the 1st-gear position. With the switching clutch C0, the first clutch C1 and the second clutch C2 being coupled, a 3rd-gear position is established with a speed ratio γ3 of, for instance, about 1.000 that is lower than that of the 2nd-gear position.

With the first clutch C1, the second clutch C2 and the switching brake B0 being coupled, a 4th-gear position is established with a speed ratio γ4 of, for instance, about 0.705 that is lower than that of the 3rd-gear position. Further, with the second clutch C2 and the second brake B2 being coupled, a reverse-gear position is established with a speed ratio γR of, for instance, about 2.393 that is intermediate between those of the 1st-gear and 2nd-gear positions. In addition, for the neutral "N" state to be established, for instance, only the switching clutch C0 is coupled.

In contrast, for the shifting mechanism 10 to function as the continuously variable transmission, both the switching clutch C0 and the switching brake B0 are uncoupled as indicated in the operation Table shown in FIG. 15. This allows the differential portion 11 to function as the continuously variable transmission, and the automatic transmission 20 connected to the differential portion 11 in series to function as the step-variable transmission. When this takes place, the rotating speed input to the automatic transmission 72 for the gear positions placed in the 1st-gear, 2nd-gear and 3rd-gear positions, respectively, that is, the rotating speed of the transmitting member 18, is caused to continuously vary. This allows the respective gear positions to have speed ratios in continuously variable ranges. Accordingly, the automatic transmission 72 has a speed ratio that is continuously variable across the adjacent gear positions, causing the shifting mechanism 70 to have the overall speed ratio γT variable in a continuous fashion as a whole.

FIG. 16 shows a collinear chart representing relative relations on the rotating speeds of the rotating elements coupled in differing states for the intended gear positions in the shifting mechanism 70, respectively. The shifting mechanism 70 is structured with the differential portion 11 functioning as the continuously variable shifting portion or first shifting portion, and the automatic transmission 72 functioning as the step-variable shifting portion or a second shifting portion. For the switching clutch C0 and the switching brake B0 to be uncoupled, and for the switching clutch C0 or the switching brake B0 to be coupled, the rotating elements of the power distributing mechanism 16 rotate at the same speeds as those stated above.

In FIG. 16, the automatic transmission 72 operates on four vertical lines Y4, Y5, Y6 and Y7 corresponding to fourth to seventh rotating elements RE4 to RE7 in order from the left, respectively. The fourth rotating element (fourth element) RE4 represents that the second and third sun gears S2 and S3 are connected to each other. The fifth rotating element (fifth element) RE5 corresponds to the third carrier CA3. The sixth rotating element (sixth element) RE6 represents that the second carrier CA2 and the third ring gear R3 are connected to each other. The seventh rotating element (seventh element) RE7 corresponds to the second ring gear R2.

Further, in the automatic transmission 72, the fourth rotating element RE4 is selectively connected to the transmitting member 18 via the second clutch C2 and selectively connected to the case 12 via the first brake B1. The fifth rotating element RE5 is selectively connected to the case 12 via the second brake B2. The sixth rotating element RE6 is connected to the output shaft 22 of the automatic transmission 72. The seventh rotating element RE7 is selectively connected to the transmitting member 18 via the first clutch C1.

The automatic transmission 72 operates in a manner as shown in FIG. 16. That is, with both the first clutch C1 and the second brake B2 being coupled, an intersection point between an inclined linear line L1 and the vertical line Y6 represents the rotating speed of the output shaft 22 in the 1st-speed position. The inclined linear line L1 passes across an intersection point between the vertical line Y7 indicative of the rotating speed of the seventh rotating element RE7 (R2), and an intersection point between the vertical line Y5 indicative of the rotating speed of the fifth rotary element RE5 (CA3), and a horizontal line X1. The vertical line Y6 represents the rotating speed of the sixth rotating element RE6 (CA2, R3) connected to the output shaft 22.

Likewise, an intersection point between an inclined linear line L2 determined with both the first clutch C1 and the first brake B1 being coupled, and the vertical line Y6 indicative of the rotating speed of the sixth rotary element RE6 connected to the output shaft 22, represents the rotating speed of the output shaft 22 in the 2nd-speed position. An intersection point between a horizontal linear line L3 determined with both the first clutch C1 and the second clutch C2 being coupled, and the vertical line Y6 indicative of the rotating speed of the sixth rotary element RE6 connected to the output shaft 22, represents the rotating speed of the output shaft 22 in the 3rd-speed position. For the 1st-speed to the 3rd-speed positions, as a result of the switching clutch C0 being coupled, the differential portion 11 inputs drive power to the seventh rotary element RE7 at the same rotating speed as the engine speed $N_E$.

However, as the switching brake B0 is coupled in place of the switching clutch C0, the differential portion 11 inputs drive power to the seventh rotary element RE7 at a rotating speed higher than the engine speed $N_E$. Thus, an intersection point between a horizontal linear line L4 determined with the first clutch C1, the second clutch C2 and the switching brake B0 being coupled, and the vertical line Y6 indicative of the rotating speed of the sixth rotary element RE6 connected to the output shaft 22, represents the rotating speed of the output shaft 22 in the 4th-speed position.

Even with the present embodiment, the shifting mechanism 70 includes the differential portion 11, functioning as the continuously variable transmission or the first shifting portion, and the automatic transmission 72 functioning as the step-variable transmission or the second shifting portion. This allows the shifting mechanism 70 to have the same advantageous effects as those of the embodiment described above.

Third Embodiment

Figure 17:
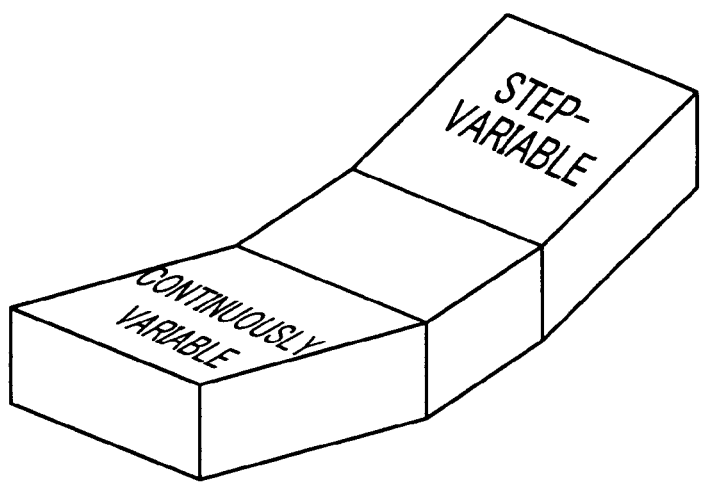
FIG. 17 shows a seesaw type switch as the switching device, being one sample of a manual select device of a shifting state operated by a user.

FIG. 17 shows an example a seesaw type switch 44 (hereinafter referred to as "switch 44"), acting as a shifting-state manual selection device, which is installed on a vehicle for a vehicle driver to manually operate. The switch 44 allows manual operation to cause the power distributing mechanism 16 to be selectively placed in the differential state and the non-differential state (locked state), that is, the continuously variable shifting state and the step-variable shifting state. The switch 44 allows the vehicle to run in a shifting state desired by the vehicle driver. The switch 44 has a continuously variable shift running command button with a display "CONTINUOUSLY VARIABLE", representing a continuously variable shift running mode, and a step-variable shift running command button with a display "STEP-VARIABLE" representing a step-variable shift running mode. Upon depression of the vehicle driver on one of these buttons, the shifting mechanism 10 can be selectively placed in the continuously variable shifting state, operative as the electrically controlled continuously variable transmission, or the step-variable shifting state operative as the step-variable transmission.

The embodiments set forth above have been described with reference to the case wherein the shifting mechanism 10 performs the automatic switching control operation to be placed in the shifting state based on variations in the vehicle condition by referring to, for instance, the relational chart shown in FIG. 6. On the contrary, in place of the automatic switching control operation or in addition thereto, the switch 44 may be manipulated for thereby executing manual switching control for the shifting state of the shifting mechanism 10. That is, the switching control means 50 may take priority to switch the shifting mechanism 10 to the continuously variable shifting state and the step-variable shifting state depending on the switch 44 selectively operated for the continuously variable shifting state and the step-variable shifting state. For instance, if the vehicle driver, desiring a running mode with a touch of feeling in the continuously variable transmission and improved fuel economy, then manually selects the continuously variable shifting to be placed by the shifting mechanism 10. Further, if another running mode is desired with the step-variable transmission performing the gear shifting accompanied by a rhythmical change in the rotating speed $N_E$ of the engine, the vehicle driver manually selects the step-variable shifting state to be placed by the shifting mechanism 10.

Further, the switch 44 may be configured to have a neutral position in which none of the continuously variable shifting state and the step-variable shifting state is selected. With the switch 44 remaining under the neutral position, that is, when no desired shifting state is selected by the vehicle driver or when a desired shifting state remains in the automatic switching mode, the shifting mechanism 10 may suffice to execute the automatic switching control operation for a particular shifting state.

Although embodiments of the present invention were described above in detail based on the drawings, the present invention can also be applied to other modes. For example, in the above-described embodiments, the input torque limit means 86 limits the engine torque $T_E$ to the value not more than the predetermined value TE1 to thereby limit the input torque $T_{INS}$ inputted into the differential portion 11 to not more than the predetermined torque TS1. However in place of or in addition to limiting the engine torque $T_E$, the input torque limit means 86 may increase the torque necessary for driving of a vehicle auxiliary machine driven by the power of the engine 8 to thereby limit the input torque $T_{INS}$ inputted into the differential portion 11 to the value not more than the predetermined torque TS1. The same effects as those of the embodiments described above are obtained in this case as well.

Also with the above-described embodiments, in the step S3 in the flowchart shown in FIG. 12, switching propriety of the differential portion 11 from the continuously variable shifting state to the step-variable shifting state by the switching control means 50 is judged by judging the engagement propriety of the switching clutch C0 or the switching brake B0 based on failure of a friction material or a hydraulic actuator of the switching clutch C0 or the switching brake B0, etc. In addition, judgment regarding the actual vehicle speed exceeding the predetermined vehicle speed V2 can be used to judge switching propriety of the differential portion 11 by the switching control means 50.

In the step S4 in the flowchart of FIG. 12, in addition to arrangement of the above-described embodiments, even upon the engagement ability of the switching clutch C0 or the switching brake B0, in the running state in which the vehicle speed V is set in the predetermined vehicle speed V2, for example, during the starting of the engine, the differential portion 11 must operate as the electrically controlled continuously variable transmission controlled by the hybrid control means 52. The command limiting the input torque $T_{INS}$, such as the engine torque $T_E$ inputted into the differential portion 11 to the value not more than the predetermined value TE1, is thus outputted to the hybrid control means 52. Because the vehicle state is thereby prevented from setting within the limit area A shown in FIG. 11, the first electric motor M1 is prevented from being made large-size and is suppressed in the durability lowering.

Also, each of the shifting mechanisms 10 and 70 of the embodiments described above is arranged to be switchable between the continuously variable shifting state and the step-variable shifting state, by the differential portion 11 (power distribution mechanism 16) being switched between the differential state for enabling the operation as the electrically controlled continuously variable transmission, and the non-differential state (lock state) for disabling this operation. The switching between these two states is performed by the differential portion 11 being switched between the differential state and the non-differential state. However, for example, even in the differential state, the differential portion 11 may function as a step-variable transmission by its shifting ratio being varied not in a continuous manner but in a stepwise manner.

In other words, the differential state/non-differential state of the differential portion 11, and the continuously variable shifting state/step-variable shifting state of the shifting mechanisms 10 and 70 are not necessarily in a one-to-one relationship. The differential portion 11 need not be arranged to be switchable between the continuously variable shifting state and the step-variable shifting state. The present invention can be applied to the shifting mechanism 10 or 70 (differential portion 11 or power distribution mechanism 16) as long as it is arranged to be switchable between the differential state and the non-differential state.

Also, in each of the above-described embodiments, as the engagement devices that selectively switch the power transmitting path between the power transmissible state and the power transmission cutoff state, the first clutch C1 and the second clutch C2 are used, which are disposed between the automatic transmission 20 or 72 and the differential portion 11 and constituting a portion of the automatic transmission 20 or 72. However, the engagement devices do not necessarily have to be the first clutch C1 and the second clutch C2, and it suffices that at least one engagement device be provided that can selectively switch the power transmitting path between the power transmissible state and the power transmission interrupted state. For example, the engagement device may be connected to the output shaft 22 or to a rotation member within the automatic transmission 20 or 72. Also, the engagement device need not constitute a portion of the automatic transmission 20 or 72 and may be provided separately from the automatic transmission 20 or 72.

In the power distribution mechanisms 16 in the illustrated embodiments, the first carrier CA1 is fixed to the engine 8, and the first sun gear S1 is fixed to the first electric motor M1, and the first ring gear R1 is fixed to the transmitting member 18. However, such connecting arrangement is not essential, and the engine 8, first electric motor M1 and transmitting member 18 are fixed to respective ones of the three elements CA1, S1 and R1 of the first planetary gear set 24.

Although the engine 8 is directly connected to the drive apparatus input shaft 14 in the illustrated embodiments, it may be operatively connected to the input shaft 14 through gears, a belt or the like, and need not be disposed coaxially therewith. In the illustrated embodiments, the first electric motor M1 and the second electric motor M2 are disposed coaxially with the drive apparatus input shaft 14, the first electric motor M1 is fixed to the first sun gear S1, and the second electric motor M2 is fixed to the transmitting member 18. However, such arrangement is not essential. For example, the first electric motor M1 may be fixed to the first sun gear S1 through gears, a belt or the like, and the second electric motor M2 may be fixed to the transmitting member 18.

Although the power distributing mechanism 16 is provided with both the switching clutch C0 and the switching brake B0, it need not be provided with both of them, and may be provided with only one of the switching clutch C0 and brake B0. Although the switching clutch C0 selectively connects the sun gear S1 and carrier CA1 to each other, it may selectively connect the sun gear S1 and ring gear R1 to each other, or the carrier CA1 and ring gear R1. In essence, the switching clutch C0 sufficiently connects any two of the three elements of the first planetary gear set 24.

The switching clutch C0 in the embodiment is engaged to establish the neutral "N" in the shifting mechanism 10, 70, but the neutral position need not be established by engagement thereof. The hydraulic-type frictional coupling devices such as the switching clutch C0 and switching brake B0 may be a coupling device of a magnetic-powder type, an electromagnetic type or a mechanical type, such as a powder (magnetic powder) clutch, an electromagnetic clutch and a meshing type dog clutch. The second electric motor M2 connected to the transmitting member 18 in the illustrated embodiment can be connected to the output shaft 22, or to rotating member disposed in the automatic transmission 20.

In the illustrated embodiment, further, while the step-variable type automatic transmission 20, 72 is disposed in the power transmitting path between the transmitting member 18 serving as the output member of the power distributing mechanism 16 and the drive wheels 38, a power transmitting device of the other type such as, for instance, a continuously variable transmission (CVT) may be provided or may not be necessarily provided. In case of such a continuously variable transmission (CVT), the power distributing mechanism 16 is placed in a fixed speed shifting state and serves in a step-variable shifting state as a whole. The term "step-variable shifting state" used herein refers to a state wherein power transmission is achieved mainly in a mechanical transmitting path without using an electrical path.

In an alternative, the continuously variable transmission may be configured to preliminarily store a plurality of fixed speed ratios in correspondence to gear-shift positions of a step-variable transmission to allow the gear shift to be executed using such a plurality of fixed speed ratios. The present invention can be applied to the drive apparatus not including the automatic transmission 20, 72. When the automatic transmission 20, 72 is comprised of the continuously variable transmission (CVT) or normally meshed type shifting machine as are the embodiments, en engaging device therefore is singly disposed in the power transmitting path between the transmitting member 18 and the drive wheels 38. Engagement and release of this engaging device selectively brings the power transmitting path into the power transmittable state and the power interrupted state.

In the illustrated embodiment, furthermore, while the automatic transmission 20, 72 is connected to the differential portion 11 in series via the transmitting member 18, a countershaft may be provided in parallel to the input shaft 14 to allow the automatic transmission 20, 72 to be coaxially disposed on an axis of the countershaft. In this case, the differential portion 11 and the automatic transmission 20, 72 are connected to each other in power transmitting capability via a set of transmitting members structured of, for instance, a counter-gear pair acting as the transmitting member, a sprocket and a chain.

Furthermore, the power distributing mechanism 16 in the illustrated embodiment may comprise a differential gear unit wherein, for instance, a pinion drivably rotated with an engine and a pair of bevel gears meshing with the pinion are operatively connected to the first electric motor M1 and the second electric motor M2. Moreover, while the power distributing mechanism 16 in the illustrated embodiment is composed of one set of planetary gear unit, it may comprise more than two planetary gear units that function as a power transmission with more than three stages in a fixed shifting state.

Also, the shift device 46 in the above-described embodiments has the shift lever 48 that is operated to select one of plural kinds of shift positions. In place of such the shift lever 48, a switch selectively shifted to one of plural shift positions such as a push-button type switch, a slide type switch can be adopted. In addition, a device that responds to the voice of the driver and enables a selection to be made from among a plural kinds of shift positions without manual operation, or a device that enables a selection to be made from among a plurality of types of shift positions by operation by a foot, etc., may be adopted.

Further, in the above-described embodiment a shifting range is set by operation of the shift lever 48 to the "M" position. However, instead thereof, shifting positions may be set, that is, the maximum shifting positions of the respective shifting ranges may be set as shifting positions. In this case, in the automatic transmission 20 or 72, shifting is executed by switching of the gear position. For example, when the shift lever 48 is manually operated to the up-shift position "+" or the downshift position "−" at the "M" position, one gear position among the first gear to the fourth gear is set at the automatic transmission 20 in accordance with the operation of the shift lever 48.

Also, although the switch 44 in the above-described embodiments is a seesaw type, this switch may for example be a pushbutton type switch, a two-pushbutton type switch that can hold a pressed state only in an alternative manner, a lever type switch, slide type switch, or other switch as long as it can switched to at least alternative switching between continuously variable shifting running (differential state) and step-variable shifting running (non-differential state). Also, instead of the neutral position that may be provided in the switch 44, a switch that enables selection of a state corresponding to the neutral position, may be provided separately from the switch 44. Alternately, instead of or in addition to the switch 44, a device which corresponds to the driver's voice and enables at least alternative switching between continuously variable shifting running (differential state) and step-variable shifting running (non-differential state) without manual operation, or a device enabling switching by operation by a foot, etc., may be provided.

What is claimed is:

1. A control device for vehicle drive apparatus,
the vehicle drive apparatus including a continuously variable transmission part having a differential mechanism distributing an output of an engine to a first electric motor and a transmitting member, and a second electric motor disposed in a power transmitting path from the transmitting member to drive wheels, and operating as an electrically controlled continuously variable transmission; and an automatic transmission part constituting a portion of the power transmitting path and functioning as an automatic transmission;
the control device comprising:
a differential state switching device that is disposed in the differential mechanism and that selectively switches the continuously variable transmission part between a continuously variable shifting state for performing an electrically controlled continuously variable shifting operation, and a shifting state not for performing the electrically controlled continuously variable shifting operation; and
an input torque limit means that limits, upon switching of the continuously variable transmission part from the continuously variable shifting state to the shifting state not performing the electrically controlled continuously variable shifting operation being unable, an input torque inputted into the continuously variable transmission part to a value not more than a predetermined torque.

2. The control device for vehicle drive apparatus according to claim 1, wherein the shifting state not performing the electrically controlled continuously variable shifting operation is a step-variable shifting state.

3. The control device for vehicle drive apparatus according to claim 1, wherein the input torque inputted into the continuously variable transmission part is an output torque of the engine functioning as a drive power source for vehicle running.

4. The control device for vehicle drive apparatus according to claim 2, wherein the input torque inputted into the continuously variable transmission part is an output torque of the engine functioning as a drive power source for vehicle running.

5. The control device for vehicle drive apparatus according to claim 1, wherein the input torque limit means limits the input torque inputted into the continuously variable transmission part to the value not more than the predetermined torque, based on a reaction torque generable by the first electric motor against the input torque inputted into the continuously variable transmission part.

6. The control device for vehicle drive apparatus according claim 2, wherein the input torque limit means limits the input torque inputted into the continuously variable transmission part to the value not more than the predetermined torque, based on a reaction torque generable by the first electric motor against the input torque inputted into the continuously variable transmission part.

7. The control device for vehicle drive apparatus according to claim 3, wherein the input torque limit means limits the input torque inputted into the continuously variable transmission part to the value not more than the predetermined torque, based on a reaction torque generable by the first electric motor against the input torque inputted into the continuously variable transmission part.

8. The control device for vehicle drive apparatus according to claim 4, wherein the input torque limit means limits the input torque inputted into the continuously variable transmission part to the value not more than the predetermined torque, based on a reaction torque generable by the first electric motor against the input torque inputted into the continuously variable transmission part.

9. The control device for vehicle drive apparatus according to claim 1, wherein the differential state switching device switches the continuously variable transmission part to the continuously variable shifting state and the shifting state not performing the continuously variable shifting operation, based on output of the engine.

10. The control device for vehicle drive apparatus according to claim 1, wherein the differential state switching device switches the continuously variable transmission part to the continuously variable shifting state and the shifting state not performing the continuously variable shifting operation, based on vehicle speed of the vehicle.

11. The control device for vehicle drive apparatus according to claim 1, wherein the differential state switching device switches the continuously variable transmission part to the continuously variable shifting state and the shifting state not performing the continuously variable shifting operation, based on rotation speed of the engine.

12. The control device for vehicle drive apparatus according to claim 1, wherein the automatic transmission part is disposed in the power transmitting path extending from the continuously variable transmission part to the drive wheels.

13. The control device for vehicle drive apparatus according to claim 12, wherein
the automatic transmission part functions as a step variable transmission having plural gear positions, and
the continuously variable transmission part can be switched, in each of the plural gear positions, to the continuously variable shifting state and the shifting state not performing the continuously variable shifting operation.

14. The control device for vehicle drive apparatus according to claim 1, wherein
the continuously variable transmission part has plural rotary elements, and
the differential state switching device has brake means for stopping one of the plural rotary elements, and couple means for coupling two of the plural rotary elements.

15. The control device for vehicle drive apparatus according to claim 14, wherein when the continuously variable transmission part is switched to the shifting state not performing the continuously variable shifting operation, the brake means or the couple means of the differential state switching device is selectively operated.

16. A control device for vehicle drive apparatus,
the vehicle drive apparatus including a differential portion having a differential mechanism distributing an output of an engine to a first electric motor and a transmitting member, and a second electric motor disposed in a power transmitting path from the transmitting member to drive wheels, and operating as an electrically controlled differential device;

the control device comprising:
- a differential state switching device that is disposed in the differential mechanism and that selectively switches the differential mechanism between a differential state for performing an differential action, and a locked state not for performing the differential action; and
- an input torque limit means that limits, upon the differential mechanism being unable to be switched from the differential state to the locked state, an input torque inputted into the differential portion to a value not more than a predetermined torque.

17. The control device for vehicle drive apparatus according to claim 16, wherein the input torque inputted into the differential portion is an output torque of the engine functioning as a drive power source for vehicle running.

18. The control device for vehicle drive apparatus according to claim 16, wherein the input torque limit means limits the input torque inputted into the differential portion to the value not more than the predetermined torque, based on a reaction torque generable by the first electric motor against the input torque inputted into the differential portion.

19. The control device for vehicle drive apparatus according to claim 17, wherein the input torque limit means limits the input torque inputted into the differential portion to the value not more than the predetermined torque, based on a reaction torque generable by the first electric motor against the input torque inputted into the differential portion.

20. The control device for vehicle drive apparatus according to claim 16, wherein the differential state switching device switches the differential mechanism to the differential state and the lock state, based on output of the engine.

21. The control device for vehicle drive apparatus according to claim 16, wherein the differential state switching device switches the differential mechanism to the differential state and the lock state, based on vehicle speed of the vehicle.

22. The control device for vehicle drive apparatus according to claim 16, wherein the differential state switching device switches the differential mechanism to the differential state and the lock state, based on rotation speed of the engine.

23. The control device for vehicle drive apparatus according to claim 16, wherein
the differential portion has plural rotary elements, and
the differential state switching device has brake means for stopping one of the plural rotary elements, and couple means for coupling two of the plural rotary elements.

24. The control device for vehicle drive apparatus according to claim 23, wherein when the differential mechanism is switched to the shifting state not performing the differential operation, the brake means or the couple means of the differential state switching device is selectively operated.

* * * * *